(12) United States Patent
Yokoyama et al.

(10) Patent No.: US 8,126,105 B2
(45) Date of Patent: Feb. 28, 2012

(54) FAST REACTOR HAVING REFLECTOR CONTROL SYSTEM AND NEUTRON REFLECTOR THEREOF

(75) Inventors: Tsugio Yokoyama, Yokohama (JP); Mitsuaki Yamaoka, Yokohama (JP); Yasuyuki Moriki, Kawasaki (JP); Ryoma Kato, Yokohama (JP); Yasushi Tsuboi, Yokohama (JP); Atsuko Matsuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/949,854

(22) Filed: Nov. 19, 2010

(65) Prior Publication Data

US 2011/0103535 A1 May 5, 2011

Related U.S. Application Data

(62) Division of application No. 11/060,625, filed on Feb. 18, 2005, now Pat. No. 7,864,913.

(30) Foreign Application Priority Data

Feb. 19, 2004 (JP) .................................. 2004-042822
Mar. 24, 2004 (JP) .................................. 2004-087422
May 27, 2004 (JP) .................................. 2004-157319

(51) Int. Cl.
 *G21C 7/06* (2006.01)
(52) U.S. Cl. ......... 376/220; 376/219; 376/221; 376/327
(58) Field of Classification Search .................. 376/220, 376/219, 221, 327, 355, 402–406
See application file for complete search history.

(56) References Cited

U.S. PATENT DOCUMENTS

| | | | |
|---|---|---|---|
| 3,135,665 A | 6/1964 | Koutz et al. |
| 3,321,371 A | 5/1967 | Toyozo et al. |
| 3,338,790 A | 8/1967 | Erskine et al. |
| 3,546,068 A | 12/1970 | Schluderberg |
| 3,607,642 A | 9/1971 | Murdock et al. |
| 3,945,883 A | 3/1976 | Hind et al. |
| 4,030,974 A | 6/1977 | Neef |
| 4,110,158 A | 8/1978 | Maly et al. |
| 4,181,571 A | 1/1980 | Jolly |
| 4,344,914 A | 8/1982 | Rosa |

(Continued)

FOREIGN PATENT DOCUMENTS

JP 4-194780 7/1992

(Continued)

*Primary Examiner* — Ricardo Palabrica
(74) *Attorney, Agent, or Firm* — Oblon, Spivak, McClelland, Maier & Neustadt, L.L.P.

(57) ABSTRACT

A fast reactor having a reflector control system is provided which decreases the change in reactivity of the reactor core with time without performing control of a reflector lifting speed and that of a water flow rate. The above fast reactor has a liquid metal coolant, a reactor core immersed therein, and a neutron reflector which is provided outside the reactor core and which is moved in a vertical direction for adjusting leakage of neutrons therefrom for controlling the reactivity of the reactor core. The neutron reflector described above is gradually moved in an upward direction with the change in reactivity caused by fuel burn-up, and at least a part of a lower region of the neutron reflector is a high reflection region having a high neutron reflection ability as compared to that of the other region. The high reflection region is located from the bottom to a place between one fourth and one half of the height of the neutron reflector from the bottom end thereof.

9 Claims, 24 Drawing Sheets

U.S. PATENT DOCUMENTS

| | | |
|---|---|---|
| 4,372,977 A | 2/1983 | Lover et al. |
| 4,416,851 A | 11/1983 | Duncombe et al. |
| 4,557,892 A | 12/1985 | Komoda |
| 4,654,193 A | 3/1987 | Amano et al. |
| 5,196,159 A | 3/1993 | Kawashima et al. |
| 5,400,375 A | 3/1995 | Suzuki et al. |
| 5,420,897 A * | 5/1995 | Kasai et al. .................. 376/220 |
| 6,285,728 B1 * | 9/2001 | Ueda et al. .................... 376/327 |
| 7,139,352 B2 | 11/2006 | Nishiguchi et al. |
| 2002/0075983 A1 * | 6/2002 | Nishiguchi et al. ........... 376/220 |

FOREIGN PATENT DOCUMENTS

| | | |
|---|---|---|
| JP | 7-306282 | 11/1995 |
| JP | 2001-235574 | 8/2001 |

\* cited by examiner

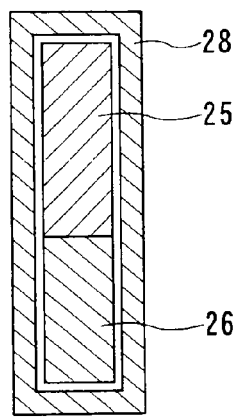 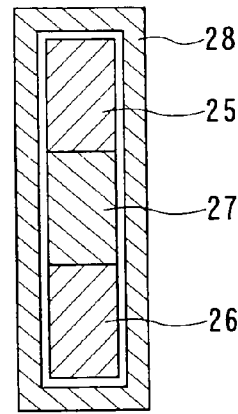
FIG. 9A  FIG. 9B
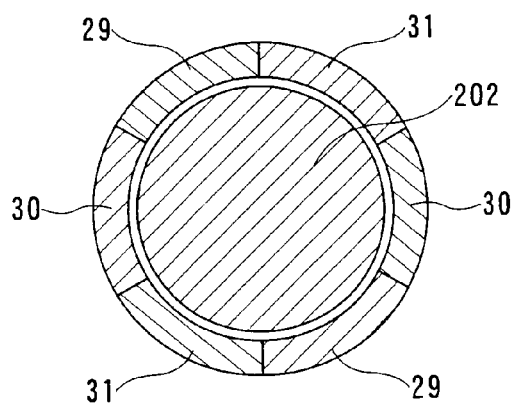
FIG. 10
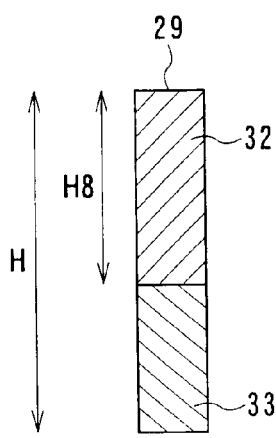 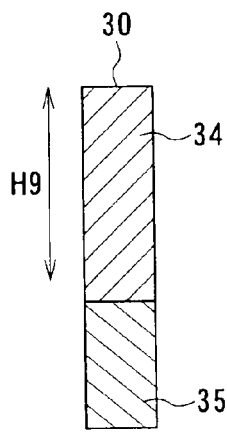 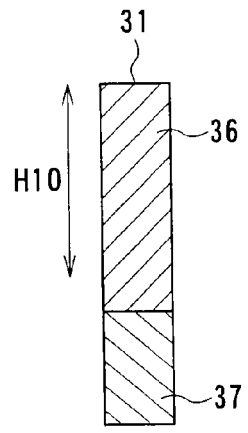
FIG. 11A  FIG. 11B  FIG. 11C

SPECIFICATION EXAMPLE OF FAST REACTOR HAVING REFLECTOR CONTROL SYSTEM

| ITEMS | UNIT | SPECIFICATION |
|---|---|---|
| LIFE OF REACTION CORE | YEARS | APPROXIMATELY 30 |
| ELECTRICAL OUTPUT | MWe | 50 |
| THERMAL OUTPUT | MWt | 130 |
| EQUIVALENT DIAMETER OF REACTION CORE | cm | 130 |
| HEIGHT OF REACTION CORE | cm | 200 |
| NUMBER OF FUEL ASSEMBLIES | SET | 18 |
| THICKNESS OF REFLECTOR | cm | 30 |
| LENGTH OF REFLECTOR | cm | 200 |
| MATERIAL OF REFLECTOR | — | STAINLESS STEEL |
| NUMBER OF CORE SHUTDOWN RODS | SET | 1 |
| FUEL OF REACTION CORE | — | URANIUM METAL U-Zr (10% OF Zr) |
| U ENRICHMENT FACTOR | PERCENT BY WEIGHT | 12/14 |
| DIAMETER OF FUEL PIN | mm | 13 |

FIG. 38

REFLECTOR REACTIVIY OF TYPICAL REFLECTOR MATERIALS

|  | REFLECTOR REACTIVITY (RELATIVE VALUE) |
|---|---|
| FERRITE STAINLESS | 1.0 |
| AUSTENITE STAINLESS | 1.2-1.4 |
| GRAPHITE | 1.2-1.7 |

FIG. 43

COMPOSITION OF TYPICAL STAINLESS STEEL ON WEIGHT RATIO

| ELEMENT | FERRITE STAINLESS 9Cr-1Mo | AUSTENITE STAINLESS TYPE316 |
|---|---|---|
| Cr | 0.09 | 0.17 |
| Mn | 0.00 | 0.02 |
| Fe | 0.90 | 0.64 |
| Ni | 0.00 | 0.14 |
| Mo | 0.01 | 0.03 |

FIG. 44

COMPOSITION OF TYPICAL HIGH NICKEL STEEL ON WEIGHT RATIO

| ELEMENT | HIGH NICKEL STEEL (PE 16) |
|---|---|
| Cr | 0.155-0.175 |
| Fe | BALANCE (APPROXIMATELY 0.35) |
| Ni | 0.42-0.45 |
| Mo | 0.028-0.038 |
| Ti | 0.011-0.013 |
| Ai | 0.011-0.013 |

FIG. 45

COMPOSITION OF TYPICAL AUSTENITE STAINLESS STEEL
/CONTAINING TITANIUN ON WEIGHT RATIO

| ELEMENT | PNC316 | PNC1520 |
|---|---|---|
| Cr | 0.16 | 0.15 |
| Mn | 0.018 | 0.0175 |
| Fe | APPROXIMATELY 0.65 | APPROXIMATELY 0.6 |
| Ni | 0.14 | 0.20 |
| Mo | 0.025 | 0.025 |
| Ti | 0.001 | 0.0025 |

FAST REACTOR HAVING REFLECTOR CONTROL SYSTEM AND NEUTRON REFLECTOR THEREOF

CROSS-REFERENCE TO RELATED APPLICATIONS

This application is a Division of U.S. application Ser. No. 11/060,625, filed Feb. 18, 2005, and is based upon and claims priority from prior Japanese Patent Applications 2004-042822, filed Feb. 19, 2004; JP 2004-087422, filed Mar. 24, 2004; and JP 2004-157319, filed May 27, 2004, the entire contents of which are incorporated herein by reference.

BACKGROUND OF THE INVENTION

1. Field of the Invention

The present invention relates to fast reactors having a reflector control system and neutron reflectors therefor, and more particularly, relates to a fast reactor having a reflector control system and a neutron reflector therefor, the fast reactor controlling reactivity of a reactor core through adjustment of leakage of neutrons leaked therefrom by moving the neutron reflector in a vertical direction which is disposed outside the reactor core immersed in a liquid metal coolant.

2. Description of the Related Art

In general, in nuclear reactors such as a fast reactor, as a method for controlling the reactivity of a reactor core, for example, a method using a control rod and a method for controlling a leak rate of neutrons may be mentioned as disclosed in Japanese Patent Nos. 2835161 and 2892824.

Of the methods mentioned above, a method for controlling a leak rate of neutrons is suitably used for a nuclear reactor having a small reactor core, and by way of example, structures shown in FIGS. 33, 34, and 35 may be mentioned. For example, in a nuclear reactor 200, as shown in FIG. 33, a reactor core 202 is placed at a central position of a reactor vessel 201 and is enclosed by a core barrel 203. In addition, the reactor vessel 201 is filled with a liquid metal coolant 204 such as sodium metal.

FIG. 34 is a schematic cross-sectional view of the fast reactor shown in FIG. 33 taken along the line indicated by arrows XXXIV, the fast reactor being viewed along the direction shown by the arrows XXXIV.

For example, as shown in FIG. 34, in an area enclosed by the core barrel 203, 18 hexagonal fuel assemblies 205 are disposed, and at the central place of the fuel assemblies 205, a channel 206 for a neutron absorbing rod (hereinafter referred to as "neutron absorbing channel") is provided. The neutron absorbing channel 206 is used for the reactivity control of the reactor core 202 and is pulled out upward in operation. In addition, reference numeral 207 indicates a guard vessel, that is, a protective container surrounding the reactor vessel 201.

In FIG. 33, outside the core barrel 203, a partition 208 is provided with a space interposed therebetween, and in addition, in this space interposed between the partition 208 and the core barrel 203, a neutron reflector 209 which moves along the reactor core 202 and a neutron reflector drive device 210 are provided. The neutron reflector drive device 210 moves the neutron reflector 209 by driving a drive rod 211 fitted thereto.

In addition, the space between the core barrel 203 and the partition 208 is a movement zone Z in which the neutron reflector 209 is moved during operation of the reactor core 202 and through which the coolant 204 is allowed to flow. Furthermore, between the partition 208 and the reactor vessel 201, a great number of neutron shielding members 212 are provided. The neutron shielding members 212 are provided for restricting the amount of neutron radiation of the reactor vessel 201 to a predetermined value or less which is determined for each plant in accordance with the life thereof, and are each formed of a plurality of neutron shielding rods 212a.

As the neutron shielding member 212, in addition to a structural member formed of stainless steel, for example, there may be mentioned a pin accommodating a $B_4C$ ceramic containing boron which has a high neutron absorbing ability, a metal, such as hafnium or tantalum, or a material containing a compound of the material mentioned above.

In addition, in Japanese Patent No. 3126502, a technique of enhancing a reactivity control ability of the neutron reflector 209 has been disclosed in which, for example, as shown in FIG. 35, a neutron absorber or a neutron transmitting material (hereinafter referred to as "cavity") 214, which has a lower neutron reflection ability than that of the coolant 204, is placed at an upper region of a neutron reflector.

The reactor core 202, core barrel 203, partition 208, neutron reflector 209, and neutron shielding members 212 are provided on a supporting structure 215 formed at the bottom portion side of the reactor vessel 201. The supporting structure 215 has a great number of holes through which the coolant is allowed to flow, and in addition, between the supporting structure 215 and the reactor vessel 201, a bottom plenum 216 is provided.

In addition, at a head portion side of the neutron shielding members 212 provided between the partition 208 and the reactor vessel 201, an intermediate heat exchanger 218 and an electromagnetic pump 219 are provided. The intermediate heat exchanger 218 is provided with a secondary coolant-path pipe 220.

An opening of a head portion of the reactor vessel 201 is closed with a shielding plug 222, and the inside of the reactor vessel 201 is filled with the liquid metal coolant 204 such as liquid sodium. In addition, between the coolant 204 and the shielding plug 222, a head plenum 223 filled with an inert gas is formed.

FIG. 36 is a vertical cross-sectional view of the fuel assembly 205 of the nuclear reactor and the vicinity of the fuel assembly 205.

As shown in FIG. 36, the fuel assembly 205 has a fuel pin 226 received in a hexagonal-shaped wrapper tube 225 made of stainless steel and neutron shielding members 227a and 227b provided at a head portion and a bottom portion, respectively, of the wrapper tube 225.

The fuel pin 226 is formed of a fuel portion 226a and a plenum portion 226b in which gas components generated by nuclear fission are to be enclosed. This fuel pin 226 helps the coolant 204 to flow through the wrapper tube 225 by a wire wrap or a grid design (both of which are not shown in the figure), and one end of the fuel pin 226 is inserted into the wrapper tube 225.

In addition, the fuel assembly 205 has a coolant outlet 229 at a head portion side and a coolant inlet 230 at a bottom portion side, and in addition, an entrance nozzle 231 having the coolant inlet 230 therein is fitted to a core holding plate 232.

In a nuclear reactor having the structure described above, the coolant 204 is circulated by a drive force of the electromagnetic pump 219 in the reactor vessel 201 in a direction indicated by arrows and is allowed to flow inside the reactor core 202. The coolant 204 which flows inside the reactor core 202 takes away heat therefrom.

The coolant 204, which flows inside the partition 208 from the bottom portion side to the head portion side and which takes off the heat from the reactor core 202, enters the reactor core 202 and absorbs the heat generated by nuclear fission therein, and hence the temperature of the coolant 204 is increased. The coolant 204 thus heated enters the intermediate heat exchanger 218 to exchange heat with a secondary coolant, and as a result, the temperature of the coolant 204 is decreased.

After the coolant 204 thus cooled flows through the intermediate heat exchanger 218, the pressure of the coolant 204 is increases by the drive force of the electromagnetic pump 219 and is supplied to the supporting structure 215 through the area outside the partition 208 in which the neutron shielding members 212 are provided. Furthermore, after supplied to the bottom plenum 216, the coolant 204 flows to the bottom portion side of the reactor core 202 and again enters the reactor core 202, so that the coolant 204 is repeatedly circulated as described above.

On the other hand, by the drive force of the neutron reflector drive device 210 provided on the shielding plug 222, the neutron reflector 209 is moved in the space between the core barrel 203 and the partition 208 along the reactor core 202 so as to adjust the leakage of neutrons from the reactor core 202 and so as to compensate for the change in reactivity caused by the burn-up in the reactor core 202. As shown in FIG. 37, the reactor core 202 is not divided and is formed of a fuel containing a fissile material at a constant ratio in the axial direction.

Next, the analysis of a fast reactor core having specifications shown in FIG. 38 was performed by way of example. That is, the following are assumed that a fast reactor core, which has a thermal power of approximately 130 MW, a core diameter of approximately 130 cm, and a core height of 200 cm and which uses a metal compound U—Zr of a uranium concentrate as a fuel, is operated for approximately 30 years without refueling, and that, in order to compensate for the change in reactivity caused by the fuel burn-up, the operation is performed while a stainless steel-made reflector having a length of 200 cm and a thickness of 30 cm is being lifted up at a predetermined rate. The calculated results of the change in reactivity of the fast reactor in this case are shown in FIG. 39.

In the case described above, the following are also assumed that when the top end of the reflector is placed at a position lower than the bottom of the reactor core, the reactor is in a subcritical state, that is, in a shutdown state; at the initial burn-up stage, when the reflector is lifted up so as to cover the reactor core in a region from the bottom to a position of approximately 75 cm therefrom in an upward direction, the critical state is obtained; and subsequently, while the operation is being performed at a constant power, the decrease in reactivity caused by burn-up is compensated for by the rise of the reflector, and the entire reactor core is covered with the reflector after 30 years. According to the results thus obtained, during operation for up to approximately 15 years, which is at the middle burn-up stage, the reactivity is maintained constant or is slightly increased. However, after the middle burn-up stage, the reactivity is gradually decreased and becomes considerably low at the last burn-up stage. In order to find out the reasons for this tendency, the reactivity is divided into two components as shown in FIG. 39. That is, one component is the change in reactivity caused by the change in composition of the fuel resulting from the burn-up thereof, and the other component is the change in reactivity caused by the movement of the reflector in the axial direction.

As shown in FIG. 39, due to the change in composition of fuel caused by the burn-up, the reactivity tends to be decreased at a constant rate. The amount of a fissile material, U-235, contained in fuel elements is monotonously decreased by burn-up. However, since a fissile material, Pu-239, is produced from U-238, the decrease in reactivity is suppressed at the initial burn-up stage. Although, when a certain amount of Pu-239 is produced as the burn-up proceeds, by the burn-up of Pu-239 itself and by the decrease of U-238 which is a parent nuclide of Pu-239, the production amount of Pu-239 tends to be saturated. Hence, the reactivity tends to be gradually decreased.

On the other hand, by the movement of the reflector in the axial direction, the reactivity is increased at an approximately constant rate at the initial burn-up stage. However, after the middle burn-up stage, the rate of increase in reactivity tends to be gradually decreased. As a result, in combination of the burn-up effect of fuel and the movement effect of reflector, as shown in FIG. 39, the total reactivity is slightly increased until the middle burn-up stage, and subsequently, the reactivity is decreased with time.

In order to increase the reactivity at the last stage, when the reflection ability of the reflector is increased (for example, the thickness thereof is increased), the reactivity is excessively increased around the middle burn-up stage. On the other hand, when the reflection ability is decreased, the increase in reactivity at the middle stage can be suppressed. However, the reactivity at the last stage is more decreased than that shown in FIG. 39.

The reactivity input by the reflector will be described in detail with reference to FIG. 40. FIG. 40 shows the change in reactivity caused by the movement of the reflector in the axial direction. The insertion depth of the reflector in FIG. 39 corresponds to distance between top of reflector and bottom of reactor core. As described above, in operation at the initial burn-up stage, the degree of insertion of the reflector is approximately 40% (insertion depth of 75 cm), and when the degree of insertion is increased from the state described above, the reactivity is approximately linearly increased. However, when the degree of insertion exceeds 60% (insertion depth of 120 cm), the increase in reactivity tends to be saturated. Hence, as shown in FIG. 39, the rate of increase in reactivity by the reflector is gradually decreased from the middle burn-up stage toward the last stage. The reasons for this tendency are that the reactivity value of the reflector is highest at the center of the reactor core at which the neutron flux is high, and that an effect obtained when the periphery of the reactor core is newly covered with the reflector becomes smaller than that obtained when the central portion of the core is newly covered with the reflector.

By the reasons described above, as long as the lifting speed of the reflector is maintained constant, the decrease in reactivity caused by the burn-up of core fuel cannot be totally compensated for by the movement of the reflector in the axial direction. Since the decrease in reactivity causes the decrease in thermal power, the thermal power with time cannot be maintained constant, and a small amount of thermal power can only be obtained around the last burn-up stage; hence, as a result, an uneconomic plant is disadvantageously to be constructed.

The tendency of the change in reactivity by the burn-up may be changed depending on design of the reactor core in some cases. However, unlike the case shown with reference to the above example, even when plutonium is used instead of the uranium concentrate, or even when the relationship between the length of the reflector and the length of the reactor core, which is determined in accordance with an operation period, is changed so that the length of the reflector may be larger or smaller than that of the core, it has been known that the tendency of the decrease in total reactivity around the last burn-up stage is not substantially changed.

One method for overcoming the decrease in reactivity described above is to control the lifting speed of the reflector with time. However, the control of the lifting speed may cause accidents in some cases due to excessive increase in reactivity resulting from malfunctions or failures of control devices. In order to avoid the accidents described above, a proposal has been disclosed in Japanese Patent No. 3131512 in which reactivity feedback is used which is generated by changing an inlet temperature of a coolant using the control of a flow rate of water supplied to a steam generator so as to maintain the power at a constant rate. In this Japanese Patent No. 3131512, the flow rate of water is controlled in accordance with thermal power of the steam generator, and the inlet temperature of a primary coolant is controlled through a secondary coolant, an intermediate heat exchanger, and the primary coolant. By this temperature feedback, it is intended to maintain the power of the reactor core at a constant rate.

However, the range of the thermal power which can be controlled by the control of the flow rate of water supplied to the steam generator is limited, and the control described above can be effectively performed only when the range of variation in thermal power is reduced to a small value by the reactivity control carried out only by the reflector. In addition, in the case in which a method for controlling a lifting speed of a reflector is carried out without performing the control described above, in view of safety, it is important that a time required for the control and a range of the lifting speed therefor be reduced as small as possible. Hence, as is the case described above, the range of variation in thermal power must be reduced to a small value by the reactivity control carried out only by the reflector.

SUMMARY OF THE INVENTION

In order to solve the problems of related techniques described above, the present invention was made, and an object of the present invention is to provide a fast reactor having a reflector control system and a neutron reflector therefor, the fast reactor being capable of maintaining the reactivity of reactor core at a constant rate so as to obtain an efficient plant having a constant thermal power. The fast reactor having a reflector control system, described above, can be achieved by, without performing control of a lifting speed of a reflector and control of a flow rate of water, decreasing the change in reactivity of the fast reactor with time, and in particular, by suppressing a decrease in reactivity at a last burn-up stage and an increase in reactivity at a middle burn-up stage.

To these ends, in the present invention, in order to decrease the change in reactivity caused by burn-up, the structure of reflector is variously designed. In particular, the reflector is divided into a plurality of regions in the axial direction, and the fast-neutron reflection ability is adjusted in the individual regions. Before the structure of the reflector mentioned above is described in detail, the evaluation results of reflector properties will first be described.

FIG. 41 is a graph showing typical neutron energy dependence of reflector reactivity, which is obtained by numerical calculation, the reflector being formed of ferrite-base stainless steel (such as 9Cr-1Mo steel). In this case, the structure of the reactor core is equivalent to that shown in FIG. 38.

As shown in FIG. 41, a neutron energy in the range of $10^7$ eV (10 MeV) to $10^4$ eV (10 keV) has a significant influence on the reflector reactivity, in particular, a neutron energy in the range of $10^6$ eV (1 MeV) to $10^5$ eV (0.1 MeV) has a dominant influence thereon. The reflector reactivity represents the ability of reflecting neutrons. Since the reflection of neutrons is generated by scattering thereof, except for a reflector having a very large neutron absorption cross-section, the neutron reflection ability of a reflector is approximately determined by the neutron scattering cross-section. In particular, from FIG. 41, it is expected that a material which has a larger neutron reflection cross-section in a range of from $10^6$ eV (1 MeV) to $10^5$ eV (0.1 MeV) has a high ability as the reflector.

FIG. 42 is a graph showing the neutron scattering cross-section in a high speed energy region of iron, chromium, and nickel, that is, primary elements of ferritic stainless steel or austentic stainless steel which are candidate materials for a reflector, and graphite which is also a candidate material for a reflector. According to FIG. 42, in a neutron energy in the range of $10^6$ eV (1 MeV) to $10^5$ eV (0.1 MeV), it is understood that chromium and nickel have a larger neutron scattering cross-section than iron, and that graphite has a larger neutron scattering cross-section on the average than chromium and nickel. Hence, it is expected that in ferritic stainless steel and austentic stainless steel, which are each primarily composed of iron, chromium, and nickel, a higher neutron reflection ability is obtained as the content of chromium and nickel is increased, and that, in addition, graphite has a higher neutron reflection ability than ferritic stainless steel and austentic stainless steel.

FIG. 43 is a table showing, for purposes of comparison, the reflector reactivities of graphite, ferritic stainless steel (such as 9Cr-1Mo steel), and austentic stainless steel (such as Type 316 steel), the two types of stainless steel mentioned above having different elemental compositions therebetween. The range of the values shown in the table is due to the range of specification of a reactor core and a reflector. FIG. 44 is a table showing the compositions of ferritic stainless steel and austentic stainless steel (however, elements C, Si, and the like at a small content, such as one percent by weight or less, are not shown in the table). Although depending on the specifications, such as compositions and dimensions of reactor core, and dimensions of reflector, it is understood that, as can be expected as described above, the reflector reactivity made of ferrite-base stainless steel or austenite-base stainless steel is increased as the contents of chromium and nickel are increased, and that, in addition, graphite has the largest reflector reactivity.

In FIG. 45, a typical composition of higher nickel steel is shown which has a higher nickel content than that of austentic stainless steel. This steel is an alloy named PE 16, which is developed and manufactured by Special Metal Corporation, USA/UK), and since the total content of chromium and nickel reaches up to approximately 60%, in view of reflector reactivity, this alloy is more advantageous. Although C, Si, Cu, B, Zr, and the like (maximum weight ratio of approximately 0.033) are contained, the elements mentioned above are not shown in FIG. 45 (see http://www.specialmetals.com/minonpe16.htm).

FIG. 46 is a graph showing the relationship between the thickness of a reflector in the radial direction and the reflector reactivity, and from this figure, regardless of the reflection material, it is understood that the reflection reactivity is increased as the thickness of the reflector is increased. In addition, it has been known that the effect of the change in density is the same as that obtained when the thickness is physically changed, and that in the case in which the same composition and the same thickness are used, the reflector reactivity is increased as the density is increased.

Further, it has been known that when stainless steel, particularly austentic stainless steel, is used, voids are formed since atoms are kicked out by radiation of fast neutrons, and that as the amount of neutron irradiation is increased, the growth of voids proceeds, resulting in a serious phenomenon called swelling (expansion). This phenomenon also degrades the material, and hence when the amount of irradiation is large, necessary measures must be taken.

Furthermore, it has also been known that when ferritic stainless steel is used instead of austentic stainless steel, the swelling is suppressed; hence, although the reflector reactivity is inferior to that of austentic stainless steel as described above, resistance against swelling is superior, and hence ferritic stainless steel has been used as a reflector material. However, when austentic stainless steel which contains chromium and nickel at a high ratio is partially used, the axial direction dependency of reflector reactivity can be advantageously changed.

A fast reactor having a reflector control system, according to the present invention, is to solve the above problems based on the investigation results described above. The fast reactor having a reflector control system, described above comprises: a liquid metal coolant; a reactor core containing a fuel and immersed in the liquid metal coolant; and a neutron reflector which is provided outside the reactor core and which is moved in a vertical direction for adjusting leakage of neutrons from the reactor core for controlling the reactivity thereof. In addition, in the fast reactor described above, the neutron reflector is gradually moved in an upward direction in accordance with the change in reactivity caused by burn-up of the fuel, and at least a part of a lower region of the neutron reflector is a high reflection region having a high fast-neutron reflection ability as compared to that of the other region.

A neutron reflector of the present invention is to solve the problems described and is to be used in a fast reactor having a reflector control system, the fast reactor comprising a liquid metal coolant, a reactor core immersed therein, and a neutron reflector provided outside the reactor core and being moved in a vertical direction for adjusting leakage of neutrons from the reactor core for controlling the reactivity of the reactor core. The neutron reflector described above has a high reflection region at least at a lower side thereof, the high reflection region having a high fast-neutron reflection ability as compared to that of the other region.

In the fast reactor having a reflector control system, according to the present invention, the change in reactivity with time can be decreased which occurs when the lifting speed of the reflector is maintained constant. In particular, when the reactivity is maintained as constant as possible by suppressing the decrease in reactivity at the last burn-up stage and the increase in reactivity at the middle burn-up stage, a plant having a constant thermal power and a high operational efficiency can be operated while control of the flow rate of water is not carried out or while the control thereof is only performed within a small control range.

In addition, since the control of the lifting speed of the reflector becomes unnecessary, reactivity input caused by malfunction of a control device can be eliminated in principle, and hence the safety can be improved. Even when the control of the lifting speed is performed, since the control range thereof can be reduced, the reactivity input caused by malfunction of a control device can be reduced, and hence the safety can also be improved.

Similar effect can be obtained if differential reflector reactivity per unit movement upward can be maintained constant by changing axially the fissile material concentration in the reactor core. Then, the change in total reactivity due to fuel burn-up and reflector movement can be suppressed during the entire serviceable life thereof. Hence, a plant can be obtained having a uniform thermal output and a high operation efficiency.

BRIEF DESCRIPTION OF THE DRAWINGS

FIGS. 9A and 9B are cross-sectional views each showing a reflector of a fast reactor according to a fifth embodiment of the present invention, the reflectors having different shapes from each other;

FIG. 10 is a horizontal cross-sectional view of a reactor core and a reflector of a fast reactor of a sixth embodiment according to the present invention;

FIGS. 11A, 11B, and 11C are cross-sectional views each showing the reflector shown in FIG. 10, the reflectors shown in FIGS. 11A, 11B, and 11C being different parts from each other;

FIG. 38 is a table showing major specifications of a fast reactor having a reflector control system;

FIG. 43 is a table showing reflector reactivity of typical reflector materials;

FIG. 44 is a table showing compositions of typical stainless steel on a weight ratio basis;

FIG. 45 is a table showing a composition of typical high nickel steel on a weight ratio basis;

DESCRIPTION OF THE PREFERRED EMBODIMENTS

Figure 33:
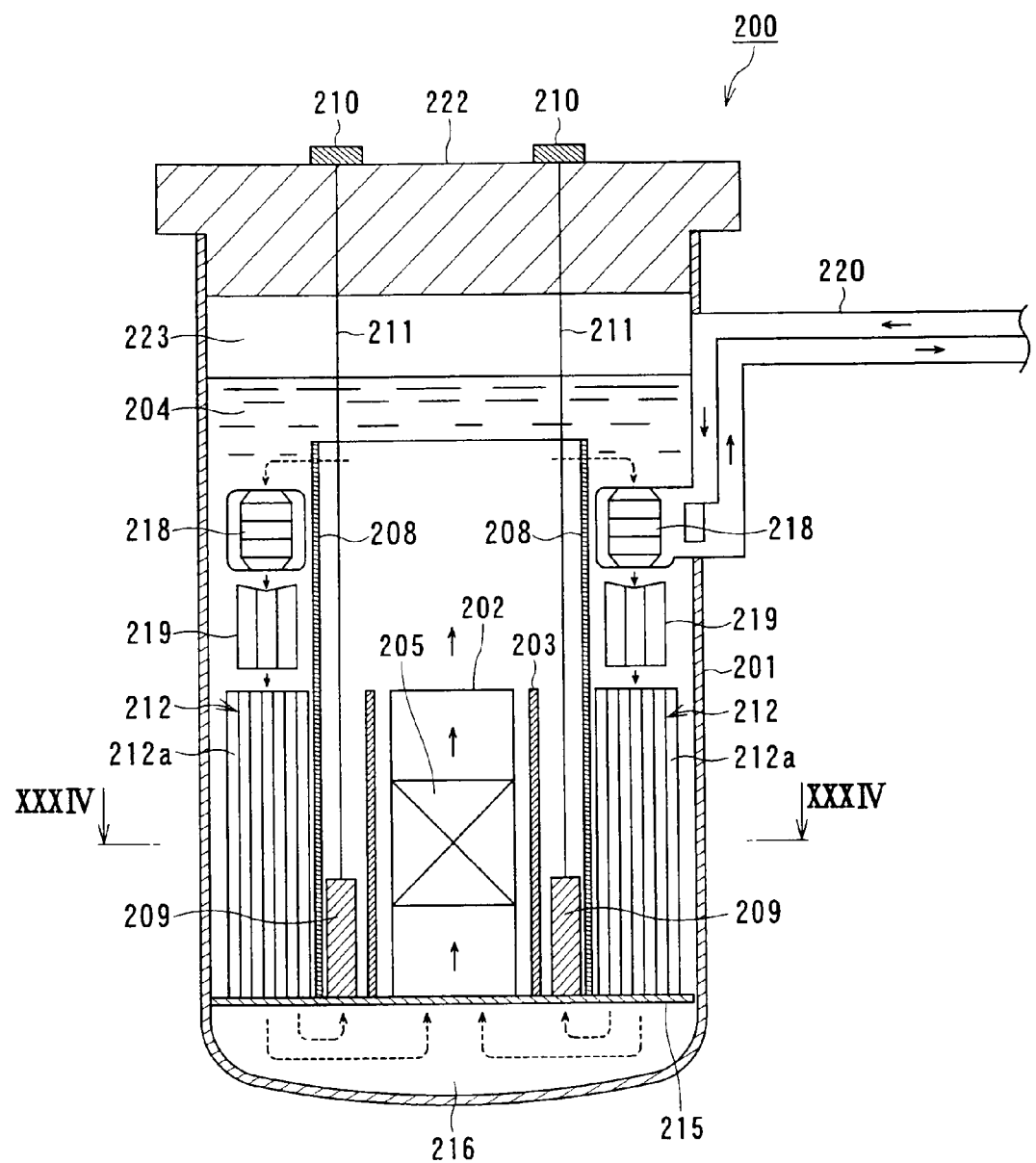
FIG. 33 is a vertical cross-sectional view of a related nuclear reactor (fast reactor)
Figure 34:
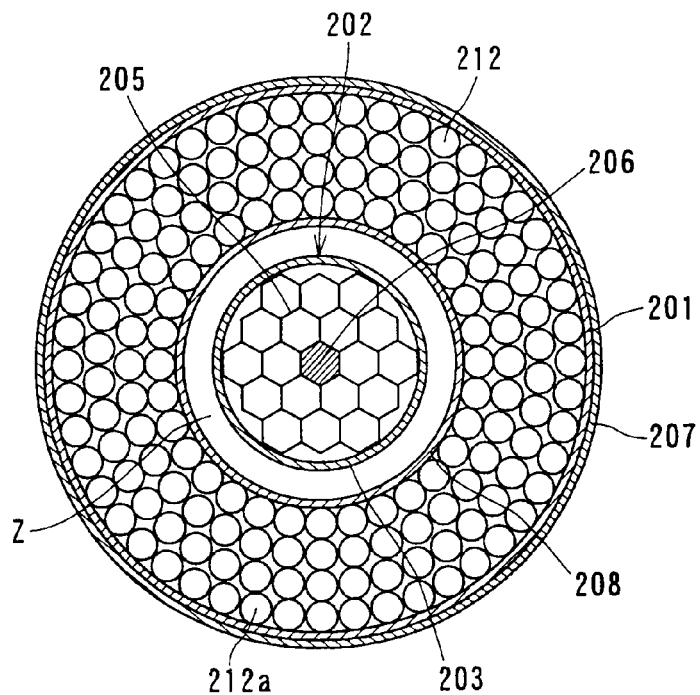
FIG. 34 is a schematic horizontal cross-sectional view of the fast reactor shown in FIG. 33 taken along the line indicated by arrows XXXIV, the reactor being viewed along a direction indicated by the arrows XXXIV.
Figure 35:
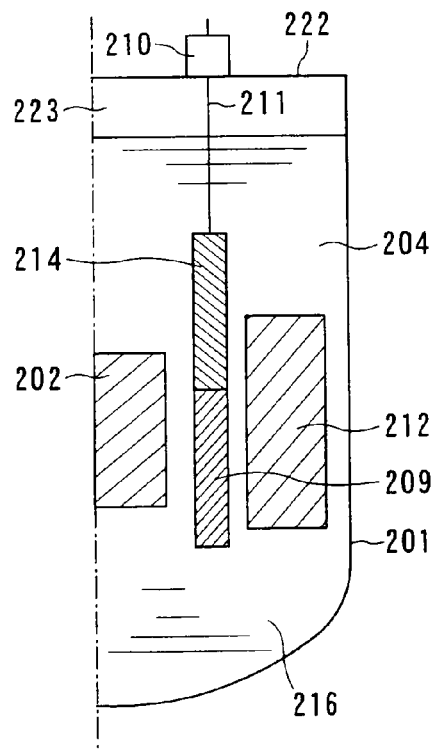
FIG. 35 is a vertical cross-sectional view showing the right half of the nuclear reactor shown in FIG. 33.
Figure 36:
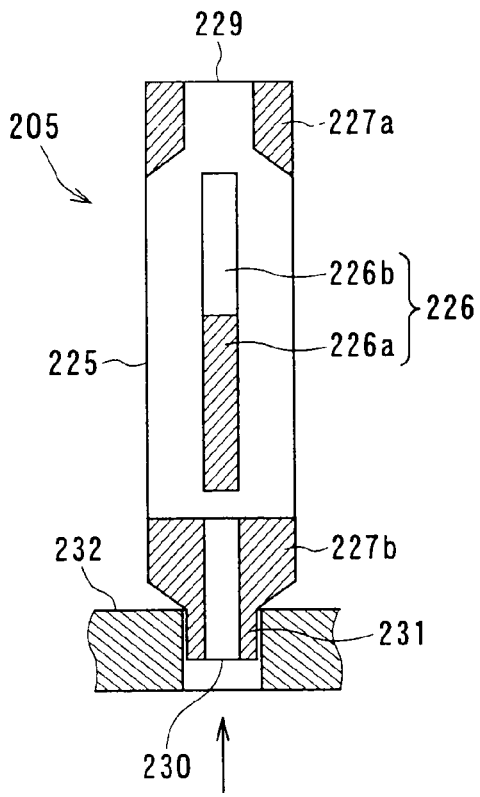
FIG. 36 is a vertical cross-sectional view showing a fuel assembly of a nuclear reactor and the vicinity thereof.
Figure 37:
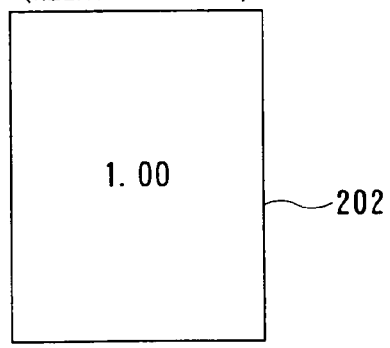
FIG. 37 is a view showing the distribution of a fissile material in the axial direction of a reactor core of a related fast reactor.
Figure 39:
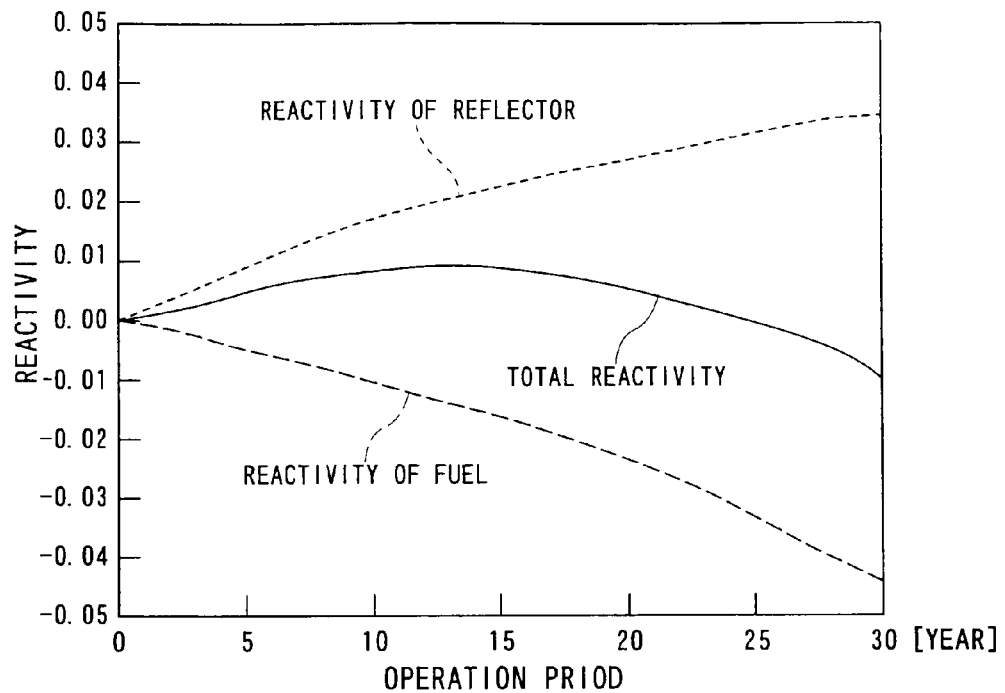
FIG. 39 is a graph showing the relationship between an operation period and reactivity of a related fast reactor.
Figure 40:
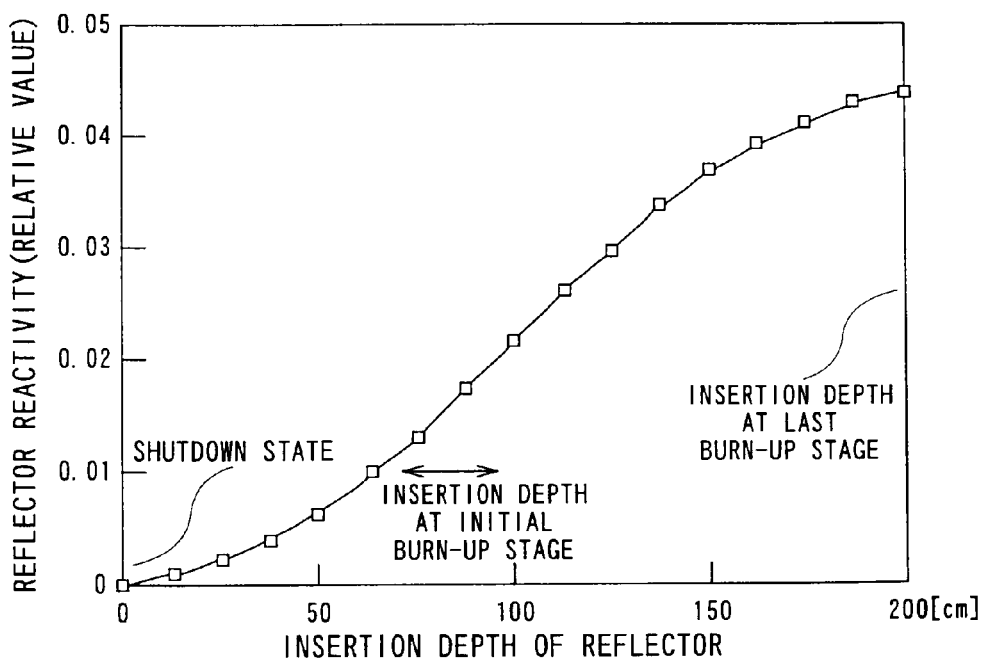
FIG. 40 is a graph showing the relationship between an insertion depth of a reflector (which corresponds to distance between top of reflector and bottom of reactor core) and reactivity of a related fast reactor.
Figure 41:
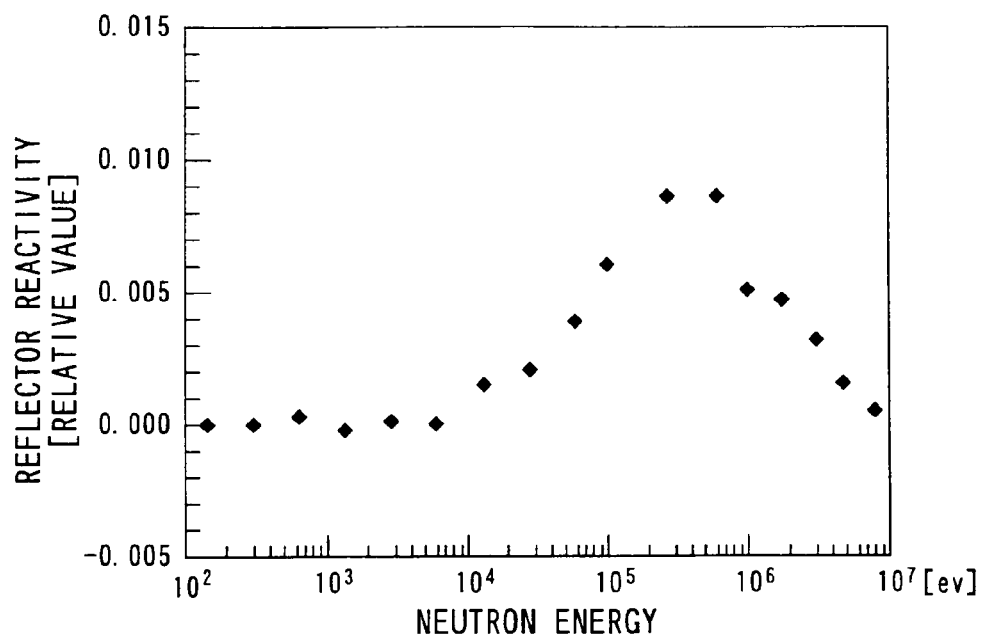
FIG. 41 is a graph showing energy dependence of reflector reactivity of a related fast reactor.

A fast reactor having a reflector control system (hereinafter simply referred to as "fast reactor") and a neutron reflector according to embodiments of the present invention will be described hereunder with reference to figures. Since the entire structure of the fast reactor is substantially equivalent to that of the fast reactor 200 shown in FIG. 33, the description thereof will be omitted in the individual embodiments.

First Embodiment

Figure 1:
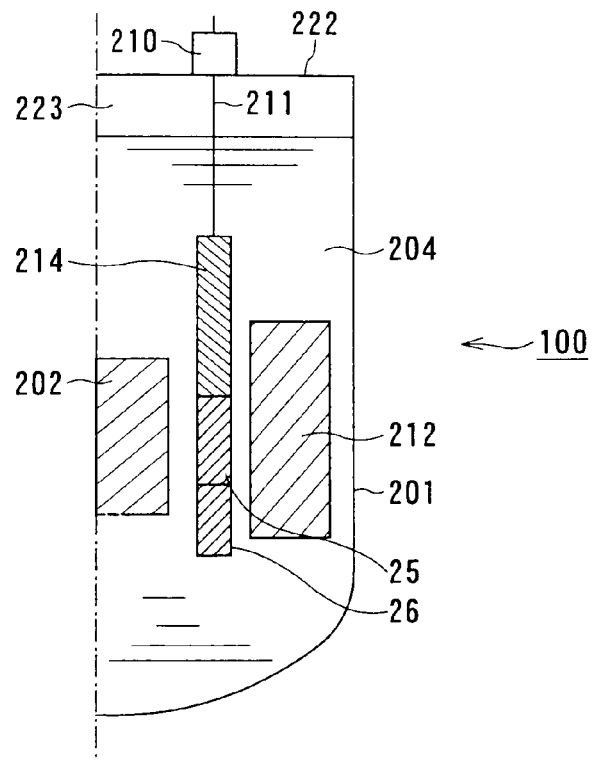
FIG. 1 is a vertical cross-sectional view showing the right half of a fast reactor of a first embodiment according to the present invention.

FIG. 1 is a vertical cross-sectional view of a fast reactor 100 of a first embodiment according to the present invention. In this embodiment, the same reference numerals of the constituent elements of the fast reactor 200 shown in FIG. 33 designate constituent elements substantially equivalent thereto, and descriptions thereof will be omitted.

The fast reactor 100 is different from the related fast reactor 200 in terms of the structure of the neutron reflector 209. That is, although the neutron reflector 209 of the fast reactor 200 is a one-piece product which is not divided and which is formed of the same material in the axial direction, the neutron reflector of the fast reactor 100 is formed of an upper reflector 25 and a lower reflector 26.

Figure 2:
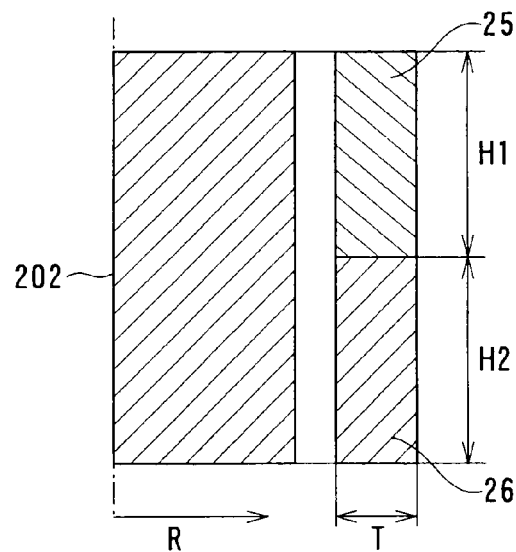
FIG. 2 is a vertical cross-sectional view of a reactor core and a reflector shown in FIG. 1.

FIG. 2 is an enlarged vertical cross-sectional view showing the positional relationship among the reactor core 202, the upper reflector 25, and the lower reflector 26 of the fast reactor 100.

As shown in FIG. 2, for example, a height H1 of the upper reflector 25 is 120 cm, a height H2 of the lower reflector 26 is 80 cm, and a total height H (=H1+H2) is 200 cm which is equivalent to the height of the reactor core 202. A thickness T of each of the upper reflector 25 and the lower reflector 26 is set to 30 cm, and a radius R of the reactor core is set to 60 cm.

The upper reflector 25 is formed of ferritic stainless steel, and the lower reflector 26 is formed of austentic stainless steel. As shown in FIG. 44, although the two types of stainless steel described above are both primarily formed of iron, the total ratio of chromium and nickel of the upper reflector 25 (ferritic stainless steel) and that of the lower reflector 26 (austentic stainless steel) are 9% and 31%, respectively, that is, the latter has a very high total ratio of chromium and nickel. As shown in FIG. 43, the austentic stainless steel having high ratios of chromium and nickel has higher reflector reactivity than that of the ferritic stainless steel.

Figure 42:
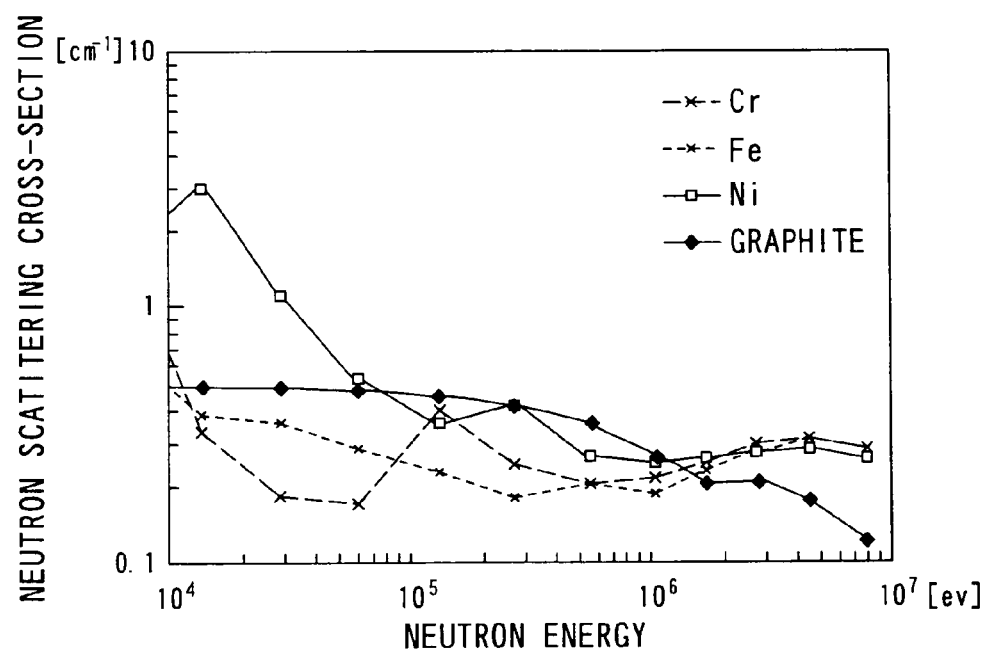
FIG. 42 is a graph showing the relationship between neutron energy and a neutron scattering cross-section of a reflector material.

As can be seen from FIG. 42 showing a graph of the relationship between a scattering cross-section and a reflector material, chromium and nickel each have a scattering cross-section larger than that of iron at a neutron energy of 1 MeV to 0.1 MeV. Hence, the austentic stainless steel having a higher total content of chromium and nickel and having a higher fast-neutron reflection ability than that of ferritic stainless steel forms a region from the bottom end of the reflector to a place at two fifths of the height of the reflector from bottom end thereof, and the ferritic stainless steel having a low fast-neutron reflection ability forms the remaining upper portion.

Figure 3:
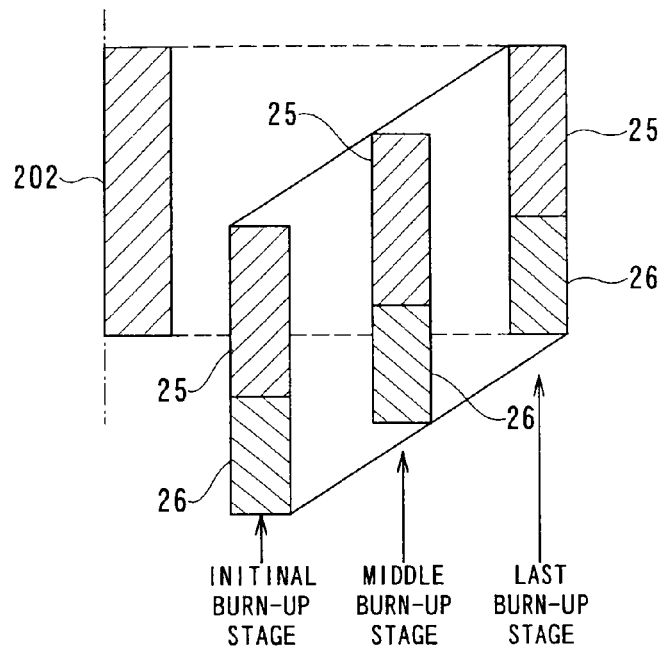
FIG. 3 is a schematic view showing movement of a reflector in operation of the fast reactor according to the first embodiment.

FIG. 3 is a schematic view showing movement of the reflector in operation. When the degree of insertion of the reflector in an upward direction is represented by a relative ratio with respect to the height of the reactor core, the ratios at the initial burn-up stage, the middle burn-up stage, and the last burn-up stage are 40%, 70%, and 100%, respectively, and the moving speed of the reflector is set constant.

Figure 4:
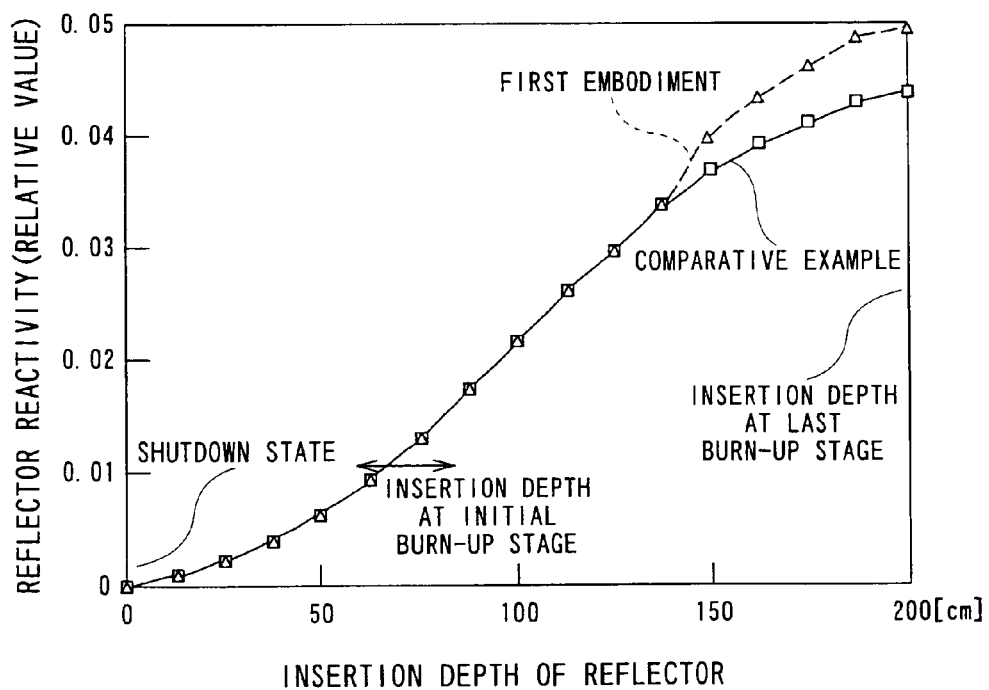
FIG. 4 is a graph showing the relationship between an insertion depth of a reflector (which corresponds to distance between top of reflector and bottom of reactor core) and reflector reactivity of the fast reactor according to the first embodiment.

FIG. 4 is a graph showing the relationship between the insertion depth of the reflector (which corresponds to distance between top of reflector and bottom of reactor core) and the reactivity.

In a comparative example in which the reflector is formed of ferritic stainless steel having a single composition, the increase in reactivity by the reflector is slowed at the last burn-up stage. The reason for this is as described before. On the other hand, in this embodiment, it is found that the reflector reactivity is increased at the insertion depth between 70% (corresponding to 140 cm from the bottom) and 100% (200 cm). This increase in reactivity is caused by the austentic stainless steel having high ratios of chromium and nickel which starts to face the reactor core at an insertion depth of approximately 70%.

Figure 5:
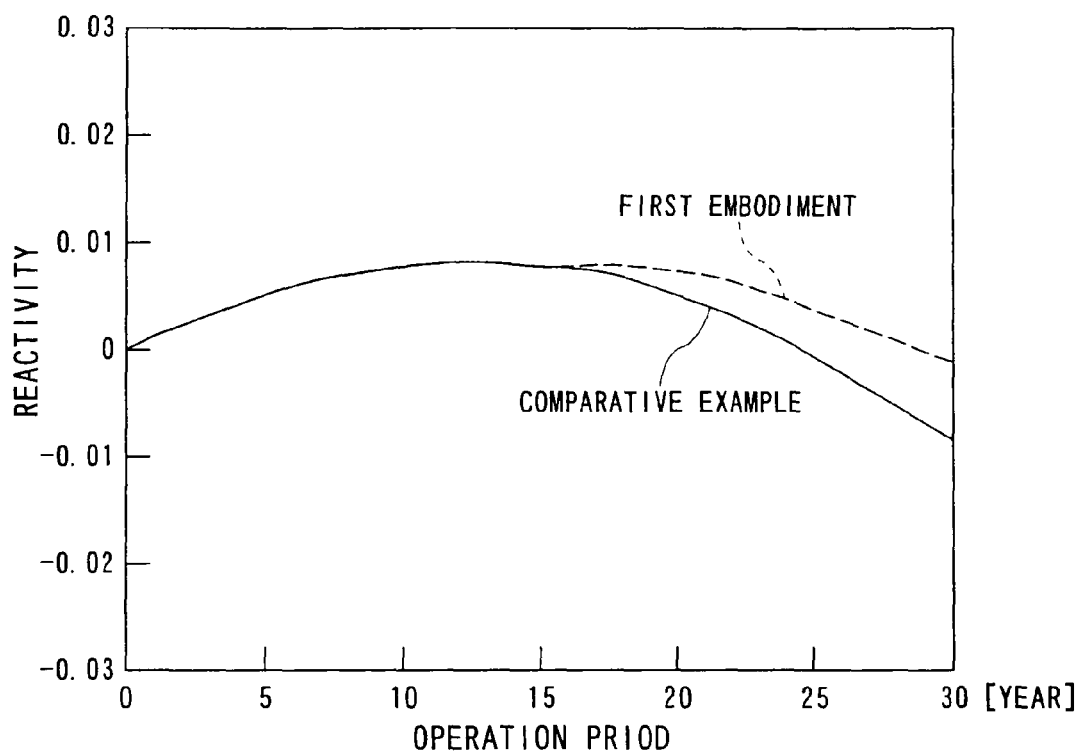
FIG. 5 is a graph showing the relationship between an operation period and reflector reactivity of the fast reactor according to the first embodiment.

FIG. 5 is a graph showing the change in reactivity in operation of the fast reactor of the first embodiment.

In the comparative example, the reactivity tends to decrease at an operation period of approximately 15 years. However, according to this embodiment, the decrease in reactivity is suppressed. Accordingly, since the decrease in thermal power of the reactor core caused by the decrease in reactivity is suppressed, the control of the flow rate of steam and the control range of the reflector moving speed may be limited or may be omitted in some cases, and as a result, a fast reactor can be provided which is driven by simple operation and which has high safety and superior efficiency.

Second Embodiment

Figure 6:
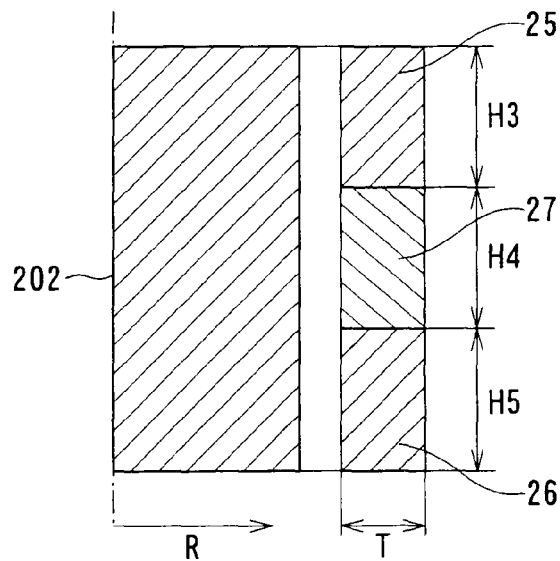
FIG. 6 is a vertical cross-sectional view of a reactor core and a reflector of a fast reactor according to a second and a fourth embodiment of the present invention.

FIG. 6 is a vertical cross-sectional view of a fast reactor having a reflector control system of a second embodiment according to the present invention, and in particular, is an enlarged view showing the reactor core 202 and reflectors 25, 26, and 27. In this figure, constituent elements corresponding to those shown in FIG. 1, which is a vertical cross-sectional view of the fast reactor of the first embodiment, are omitted. However, the elements are identical to those shown in FIG. 1 except for the reflector portion shown in FIG. 6. Heights H3, H4, and H5 of the upper reflector 25, the center reflector 27, and the lower reflector 26, respectively, are such that H3 is 70 cm, H4 is 60 cm, and H5 is 70 cm.

Figure 7:
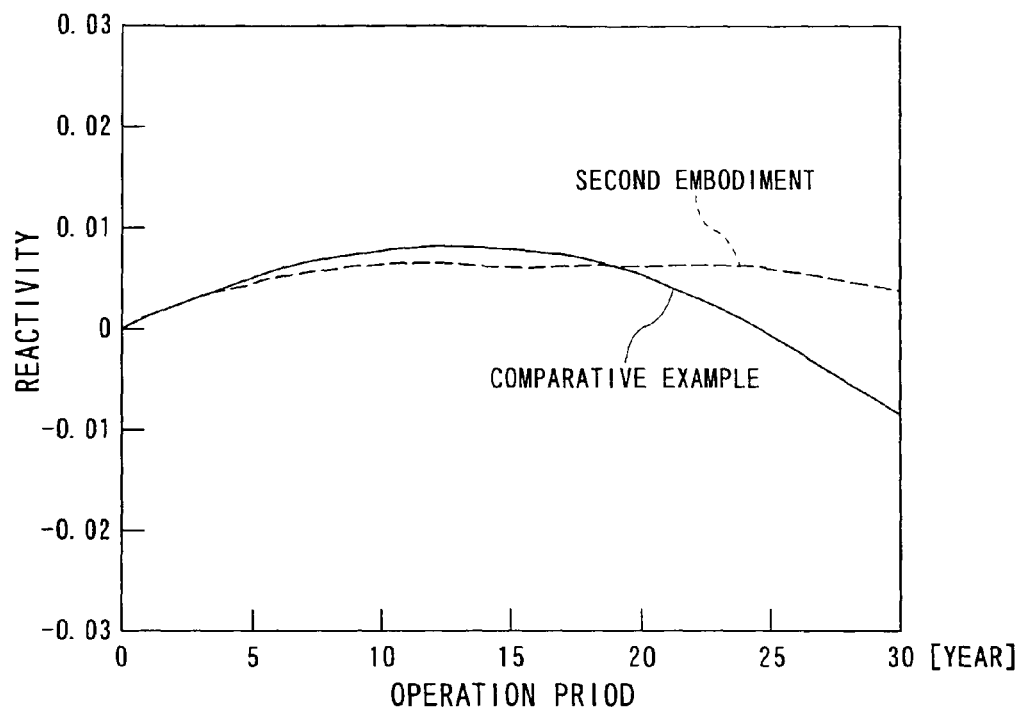
FIG. 7 is a graph showing the relationship between an operation period and reflector reactivity of the fast reactor according to the second embodiment.

In addition, the upper reflector 25 is made of austentic stainless steel, the center reflector 27 is made of ferritic stainless steel, and the lower reflector 26 is made of graphite. As for the degree of reactivity, as shown in FIG. 43, graphite is high, ferritic stainless steel is low, and austentic stainless steel is therebetween. Accordingly, as shown in FIG. 7, in addition to the suppression of the decrease in reactivity at the last burn-up stage as is the case of the first embodiment, the increase in reactivity at the middle burn-up stage can also be suppressed; hence, the change in reactivity can be more effectively suppressed than that of the first embodiment, and compared to the comparative example of the reflector made of a single composition (ferritic stainless steel), the change in reactivity can be significantly suppressed.

In addition, when boron carbide ($B_4C$) is used instead of the graphite forming the lower reflector 26, the same effect as described above can be obtained. However, in the case of boron carbide, boron bonded to carbon should not be natural boron which contains approximately 10% of B-10 but must be primarily formed of B-11 which remains after enrichment of B-10 is performed. The reason for this is that, since having a large neutron absorption ability, B-10 significantly degrades the reflector reactivity.

Third Embodiment

Figure 8A:
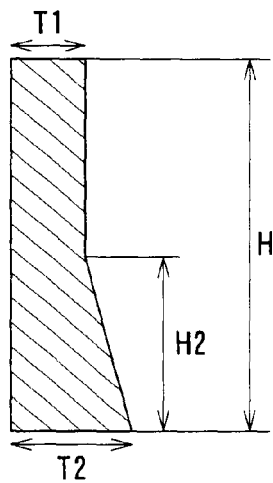
FIGS. 8A, 8B, and 8C are cross-sectional views each showing a reflector of a fast reactor according to a third embodiment of the present invention, the reflectors having different shapes from each other.
Figure 8B:
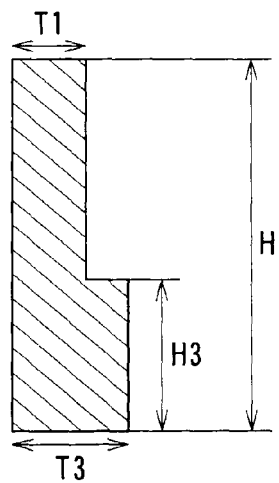
Figure 8C:
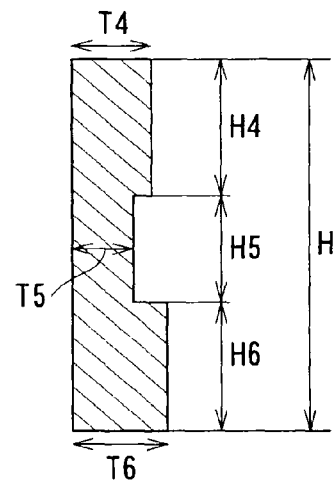
Figures 46, 47:
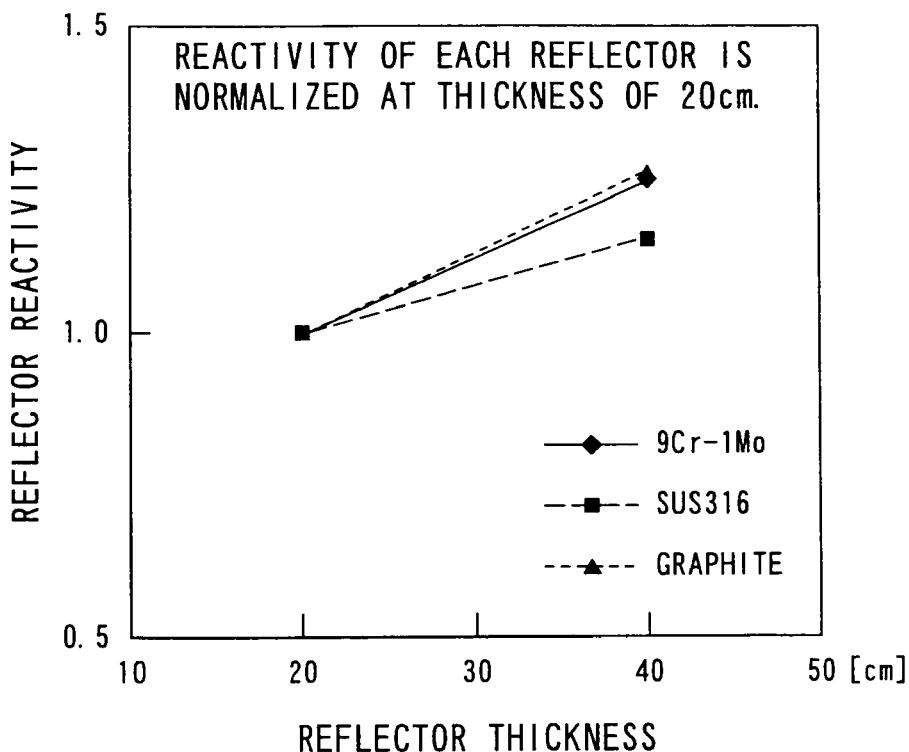
FIG. 46 is a graph showing thickness dependence in a radial direction of reflector reactivity of typical reflection materials.
FIG. 47 is a table showing compositions of typical austenitic stainless steel containing titanium on a weight ratio basis.

FIGS. 8A, 8B, and 8C are vertical cross-sectional views each showing a reflector of a fast reactor having a reflector control system of a third embodiment according to the present invention. The reflector is formed of a single composition of ferritic stainless steel. However, in the lower region of the reflector, in FIG. 8A, the thickness thereof is gradually increased toward the bottom side, and the reflector in FIG. 8B has a large and uniform thickness. As shown in FIG. 46, since the reflection ability is increased as the thickness is increased, the similar effect as that of the first embodiment can be obtained. The reflector shown in FIG. 8C has a larger thickness at the upper portion than that at the central portion, and the lower portion has the largest thickness; hence, the similar effect as that of the second embodiment can be obtained.

The dimensions of the individual reflectors are described below. In the example shown in FIG. 8A, an upper thickness T1 is set to 25 cm, the thickness is gradually increased from a lower side height H2 of 90 cm, and a bottom thickness T2 is set to 45 cm. In the example shown in FIG. 8B, the upper thickness T1 is set to 25 cm, and a thickness T3 at a lower side height H3 of 80 cm is set to 40 cm. In the example shown in FIG. 8C, a thickness T4 at an upper side height H4 of 70 cm is set to 30 cm, a thickness T5 at an intermediate side height H5 of 60 cm is set to 25 cm, and a thickness T6 at a lower side height H6 of 70 cm is set to 40 cm.

Fourth Embodiment

In a fast reactor having a reflector control system, according to a fourth embodiment, the vertical cross-sectional view of the reflector is identical to that shown in FIG. 6, and the reflector material is ferritic stainless steel (9Cr-1Mo steel) having a single composition. However, the effective density is changed. For example, the effective densities are set so as to be 90% in the upper reflector 25, 85% in the center reflector 27, and 100% in the lower reflector 26.

As a method for changing the density of ferritic stainless steel used as the reflector material in each region, for example, there may be mentioned a method of forming the structure composed of thin ferritic stainless steel sheets laminated to each other. According to the above method, the lower reflector 26 is formed of thin steel sheets laminated to each other without any spacers provided therebetween, and the upper reflector 25 and the center reflector 27 are each formed of thin steel sheets laminated to each other with spacers provided therebetween so as to have a predetermined density.

Fifth Embodiment

FIGS. 9A and 9B are vertical cross-sectional views each showing a reflector of a fast reactor having a reflector control system of a fifth embodiment according to the present invention. In an example shown in FIG. 9A, the upper reflector 25 and the lower reflector 26 (see FIG. 2) of the first embodiment are enclosed with a reflector external frame 28. The reflector external frame 28 is formed, for example, of ferritic stainless steel. The reflector external frame 28 has a thickness of approximately 3 cm and performs a function of holding the upper reflector 25 and the lower reflector 26 at individual predetermined positions. In addition, by providing ferritic stainless steel having superior resistance against swelling, which is caused by neutron radiation, at an exterior portion at which the radiation amount is highest, the superior resistance against swelling of the reflector can be retained, and simultaneously, the change in reactivity can also be decreased.

In an example shown in FIG. 9B, the case is shown in which the reflector external frame 28 is applied to the reflector (see FIG. 6) of the second embodiment. In this case, the upper reflector 25, the center reflector 27, and the lower reflector 26 are enclosed with the reflector external frame 28. The structure and the function of the reflector external frame 28 are the same as those in the case shown in FIG. 9A.

Sixth Embodiment

FIG. 10 is horizontal cross-sectional view showing a reactor core and a reflector of a fast reactor having a reflector control system of a sixth embodiment according to the present invention. An area surrounding the reactor core is radially divided into six pieces, and three types of reflectors 29, 30, and 31 are alternately disposed.

FIGS. 11A, 11B, and 11C are vertical cross-sectional views of the reflectors 29, 30, and 31, respectively. The reflector 29 is formed of an upper reflector 32 and a lower reflector 33; the reflector 30 is formed of an upper reflector 34 and a lower reflector 35; and the reflector 31 is formed of an upper reflector 36 and a lower reflector 37. The upper reflectors 32, 34, and 36 are made of ferritic stainless steel, and the lower reflectors 33, 35, and 37 are made of austenic stainless steel. As is the case of the first embodiment, the materials of the upper reflectors are equivalent to each other, and the lower reflectors are also equivalent to each other. However, in the area which is radially divided into 6 segments and is composed of the three types of reflectors, the boundaries between the upper reflector 32 and lower reflector 33, between the upper reflector 34 and lower reflector 35, and between the upper reflector 36 and lower reflector 37 are located slightly different from each other. For example, heights H8, H9, and H10 of the upper reflectors 32, 34, and 36 are set to 130 cm, 140 cm, and 150 cm, respectively, that is, the height H9 is larger than the height H8 by 10 cm, and the height H10 is larger than the height H9 by 10 cm.

As described above, when the boundary between the two reflectors disposed in the axial direction is slightly changed from the boundary of the adjacent reflectors disposed in the axial direction, rapid increase in reflector reactivity at the boundary of compositions can be decreased in the axial direction, and hence the change in reflector reactivity can be smoothed out.

Seventh Embodiment

This embodiment is equivalent to the first embodiment except that the lower reflector 26 is made of modified 316 steel, that is, austenic stainless steel containing titanium shown in FIG. 47. By this structure, since the swelling caused by radiation of fast neutrons can be suppressed, the structure can be soundly maintained even by long-period neutron radiation, the number of reflector replacements can be reduced or may not be required in some cases, and hence the economical efficiency can be improved. In addition, when modified austenic stainless steel shown in FIG. 47 is used, since the contents of chromium and nickel, and the content of titanium are larger than that of the modified 316 steel, a more superior structure may be obtained in view of the reflector reactivity and the resistance against swelling.

Eighth Embodiment

This embodiment is equivalent to the fifth embodiment except that the reflector external frame 28 is made of modified austenic stainless steel, that is, austenic stainless steel containing titanium shown in FIG. 47. By this structure, since the swelling caused by radiation of fast neutrons can be suppressed, the structure can be soundly maintained even by long-period neutron radiation, the number of reflector replacements can be reduced or may not be required in some cases, and hence the economical efficiency can be improved. In addition, when modified 316 steel or modified austenic stainless steel in FIG. 47 is used for the upper reflector 25 made of austenic stainless steel, the entire reflector can be formed to have superior resistance against swelling. Although not shown in FIG. 47, in addition to the elements listed in the figure, C, Si, Nb, P, B, and the like are also contained (see ASTM-STP1175).

In the reflectors of the individual embodiments described above, when the portion (lower reflectors 26, 33, 35, and 37) having a high fast-neutron reflection ability is located in a region between one fourth and one half of the height of the reflector from the bottom end thereof, the change in reactivity can be effectively decreased.

Ninth Embodiment

Figure 12:
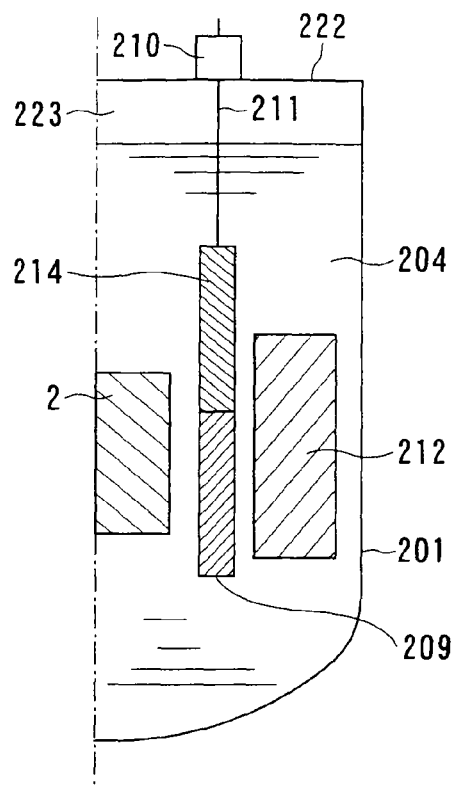
FIG. 12 is a vertical cross-sectional view showing the right half of a fast reactor of a ninth embodiment according to the present invention.
Figure 13:
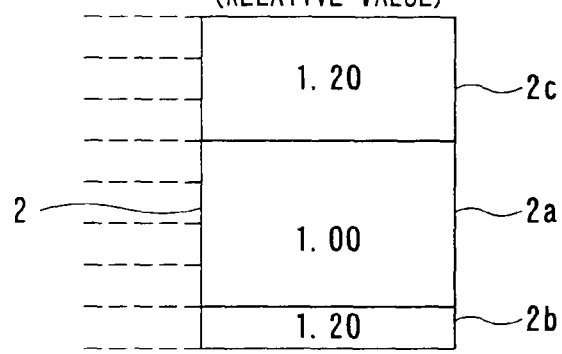
FIG. 13 is a view showing the distribution of a fissile material in the axial direction of the fast reactor shown in FIG. 12.

FIG. 12 is a schematic view showing the right half of the fast reactor 100 having a reflector control system of a ninth embodiment according to the present invention, and FIG. 13 is an enlarged view of a reactor core 2 shown in FIG. 12. The same reference numerals of the constituent elements in FIG. 1 designate the same constituent elements in FIG. 12, and descriptions thereof will be omitted. In the embodiments described above, reflector reactivity itself is changed axially so as to suppress the differential reactor reactivity per unit movement upward. However, similar effect can be obtained if differential reflector reactivity can be maintained constant by changing axially the fissile material concentration in the reactor core.

As shown in FIG. 13, the reactor core 2 has three regions in the axial direction each having a different ratio of a fissile material (U enrichment or Pu enrichment) in fuel elements. In particular, when the ratio of a fissile material in a second region 2a is set to 1.0 as a relative value, the second region being located between approximately one eighth and one half of the height of the reactor core from the bottom end thereof, the ratio of a first region 2b located under the second region 2a and that of a third region 2c located thereon are each increased by 20%, so that the relative values of the first and the third regions are each set to 1.20.

Figure 14:
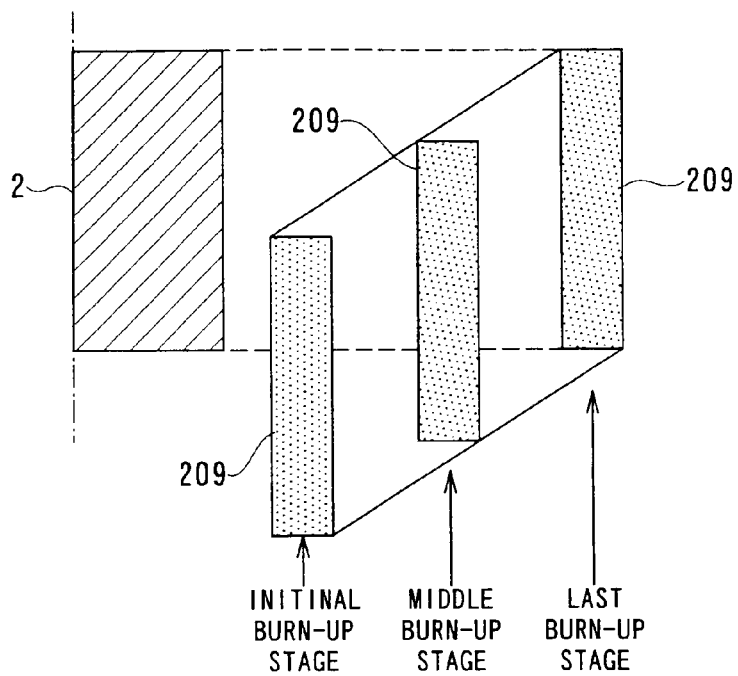
FIG. 14 is a schematic view showing movement of a reflector in operation of the fast reactor shown in FIG. 12.

FIG. 14 is a schematic view showing movement of the neutron reflector 209 in operation. When the degree of insertion of the reflector in an upward direction is represented by a relative ratio with respect to the height of the reactor core, the ratios at the initial burn-up stage, the middle burn-up stage, and the last burn-up stage are 40%, 70%, and 100%, respectively, and the moving speed of the reflector is maintained constant from the initial to the last burn-up stage.

Figure 15:
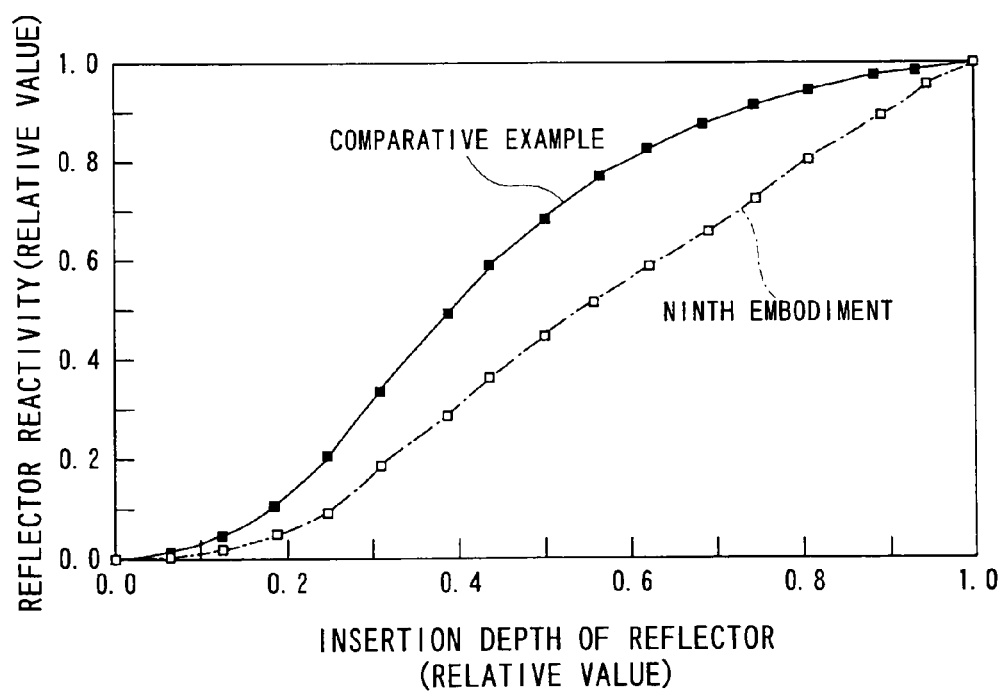
FIG. 15 is a graph showing the relationship between an insertion depth of a reflector (which corresponds to distance between top of reflector and bottom of reactor core) and reflector reactivity of the fast reactor shown in FIG. 12.

FIG. 15 is a graph showing the relationship between the insertion depth of the neutron reflector (which corresponds to distance between top of reflector and bottom of reactor core) and the reactivity.

In a comparative example in which the reactor core is formed of a fuel having a uniform fissile material ratio in the axial direction, the reflector reactivity has an S-shaped curve, and in particular, the increase in reactivity by the neutron reflector is slowed at the last burn-up stage. On the other hand, in this embodiment, it is found that the reactivity by the neutron reflector is approximately linearly increased from the initial to the last burn-up stage.

The reason for this is that, as shown in FIG. 15, since a region from a place between approximately one tenth and one fifth (the top end is regarded as one) of the height of the reactor core from the bottom end thereof to a place at approximately one half thereof has a large increase in reactivity in the comparative example, by decreasing the fissile material ratio in a region corresponding to that described above, the increase in reactivity can be suppressed.

Figure 16:
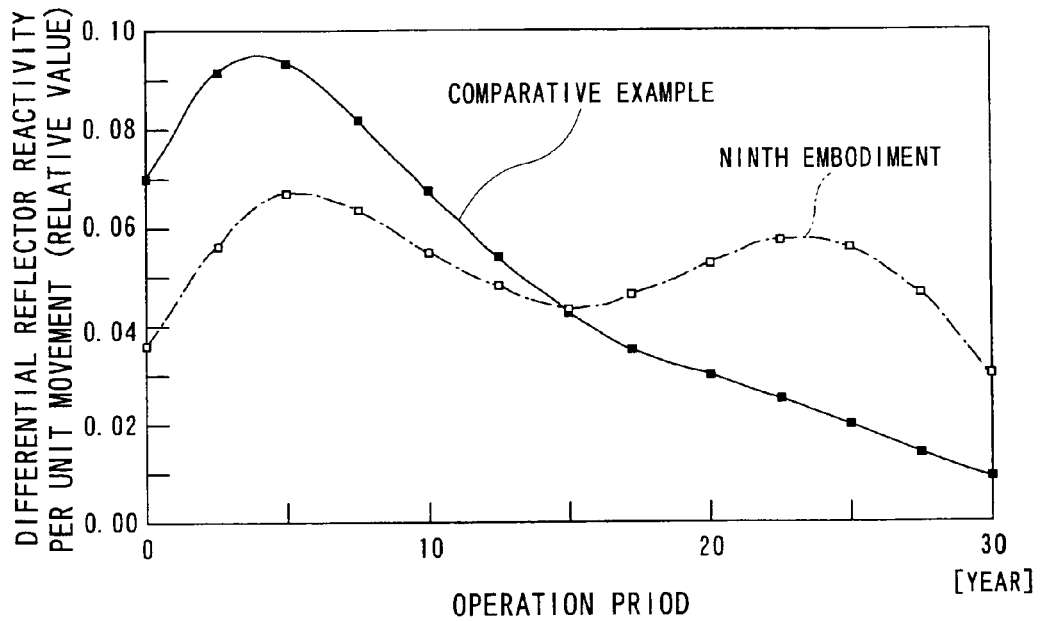
FIG. 16 is a graph showing the relationship between an operation period and differential reflector reactivity of the fast reactor shown in FIG. 12.

FIG. 16 is a graph showing the differential reflector reactivity per unit movement upward during operation according to the ninth embodiment. In the comparative example, the differential reflector reactivity tends to increase at the initial stage and then tends to decrease with time. However, in this embodiment, the differential reflector reactivity by the movement of the reflector is relatively flat from the initial to the last burn-up stage.

Accordingly, since the decrease in thermal power of the reactor core due to the decrease in reactivity can be suppressed, the control of the flow rate of steam and the control range of the reflector moving speed may be limited or may be omitted in some cases, and as a result, a fast reactor can be provided which is driven by simple operation and which has high safety and superior efficiency.

In this embodiment, a metal is used as the fuel. However, by using any type of fuel including oxide fuel or nitride fuel, such as ceramic, the same effect can be obtained.

Tenth Embodiment

Figure 17:
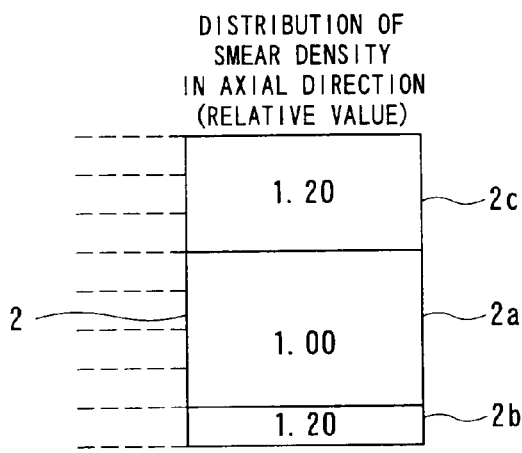
FIG. 17 is a view showing the distribution of a fuel smear density in the axial direction of a reactor core of a fast reactor of a tenth embodiment according to the present invention.

Referring to FIG. 17, a fast reactor having a reflector control system of a tenth embodiment according to the present invention will be described. FIG. 17 is an enlarged view of the reactor core 2 shown in FIG. 12. The reactor core 2 has three regions in the axial direction in which an average fuel density of fuel (fuel smear density) is changed. In this embodiment, the fuel is an oxide fuel, and the fuel diameters of the regions in the axial direction are the same. However, the fuel smear density is changed, so that the amount of a fissile material is changed as is the case of the ninth embodiment.

In particular, when the fuel smear density in the second region 2a is set to 1.0 as a relative value, the second region 2a being a region from a place between approximately one tenth and one fifth (the top end is regarded as one) of the height of the reactor core from the bottom end thereof to a place at approximately one half thereof, the fuel smear density of the first region 2b located under the second region 2a and that of the third region 2c located thereon are each increased by 20%, so that the relative values of the first and the third regions are each set to 1.20.

Accordingly, since the same effect as that of the ninth embodiment can be obtained, and the decrease in thermal power of the reactor core due to the decrease in reactivity can be suppressed, the control of the flow rate of steam and the control range of the reflector moving speed may be limited or may be omitted in some cases, and as a result, a fast reactor can be provided which is driven by simple operation and which has high safety and superior efficiency.

Eleventh Embodiment

Figure 18:
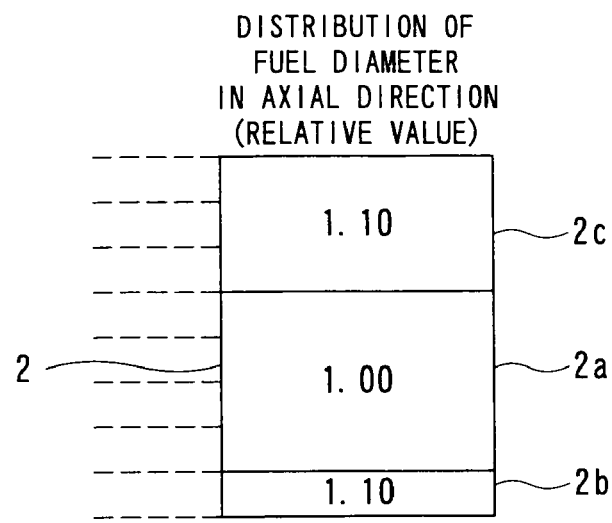
FIG. 18 is a view showing the distribution of a fuel diameter in the axial direction of a reactor core of a fast reactor of an eleventh embodiment according to the present invention.

Next, referring to FIG. 18, a fast reactor having a reflector control system of an eleventh embodiment according to the present invention will be described. FIG. 18 is an enlarged view of the reactor core 2 shown in FIG. 12. The reactor core 2 has three regions in the axial direction, and the regions have different fuel diameters from each other.

In particular, when the fuel diameter in the second region 2a is set to 1.0 as a relative value, the second region 2a being a region from a place between approximately one tenth and one fifth (the top end is regarded as one) of the height of the reactor core from the bottom end thereof to a place at approximately one half thereof, the fuel diameter of the first region 2b located under the second region 2a and that of the third region located thereon are each increased by 10%, so that the relative values of the first and the third regions are each set to 1.10.

In this embodiment, the fuel is an oxide fuel, and the fuel densities in the regions in the axial direction are identical to each other. However, the fuel diameter is changed, so that the amount of the fissile material is changed as is the case of the ninth embodiment. As a result, the same effect as that of the first embodiment can be obtained. That is, the decrease in thermal power of the reactor core due to the decrease in reactivity can be suppressed, and the control of the flow rate of steam and the control range of the reflector moving speed may be limited or may be omitted in some cases. Accordingly, a fast reactor can be provided which is driven by simple operation and which has high safety and superior efficiency.

Twelfth Embodiment

Figure 19:
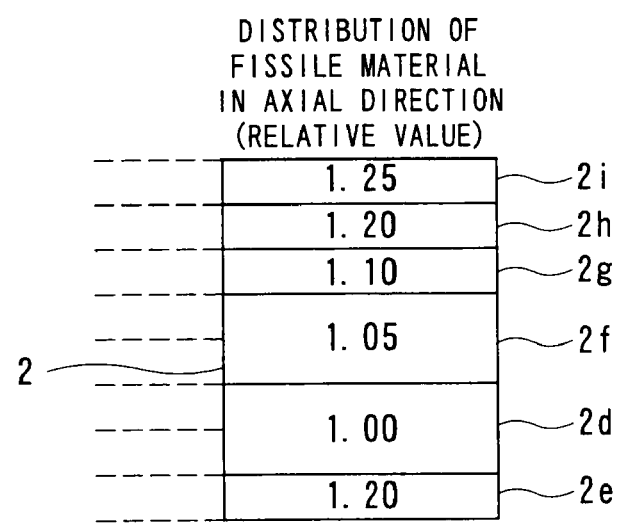
FIG. 19 is a view showing the distribution of a fissile material in the axial direction of a reactor core of a fast reactor of a twelfth embodiment according to the present invention.

Next, referring to FIG. 19, a twelfth embodiment will be described. FIG. 19 is an enlarged view of the reactor core 2 shown in FIG. 12. The reactor core 2 is divided into six regions each having a different ratio of a fissile material to total fuel material (U enrichment or Pu enrichment) in fuel elements.

In particular, when the fissile material ratio in a region 2d is set to 1.0 as a relative value, the region 2d being a region between approximately one tenth and one half of the height of the reactor core from the bottom end thereof, the fissile material ratio is increased with respect to that in the region 2d as follows. That is, as shown in FIG. 19, the fissile material ratios of a first region 2e located under the region 2d, a third region 2f on the region 2d, a fourth region 2g, a fifth region 2h, and a sixth region 2i are increased by 20% (relative value of 1.20), 5% (relative value of 1.05), 10% (relative value of 1.10), 20% (relative value of 1.20), and 25% (relative value of 1.25), respectively.

Figure 20:
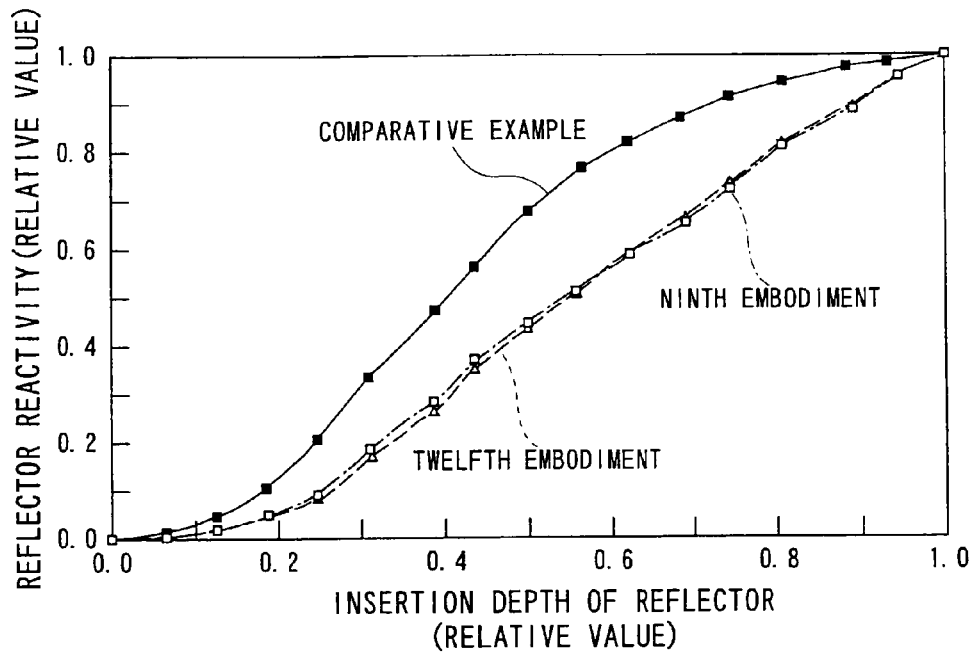
FIG. 20 is a graph showing the relationship between an insertion depth of a reflector (which corresponds to distance between top of reflector and bottom of reactor core) and reflector reactivity of the fast reactor shown in FIG. 19.

FIG. 20 is a graph showing the relationship between the insertion depth of the reflector (which corresponds to distance between top of reflector and bottom of reactor core) and the reactivity together with the results of the comparative example and the ninth embodiment. In the comparative example in which the reactor core is formed of a fuel having a uniform fissile material ratio in the axial direction, the reflector reactivity has an S-shaped curve, and in particular, the increase in reactivity by the reflector at the last burn-up stage is slowed.

On the other hand, in this embodiment, the reactivity by the reflector is approximately linearly increased from the initial to the last burn-up stage. It is found that, although the difference therebetween is not so significant, the rate of increase in reactivity of the twelfth embodiment is more constant than that of the ninth embodiment.

Figure 21:
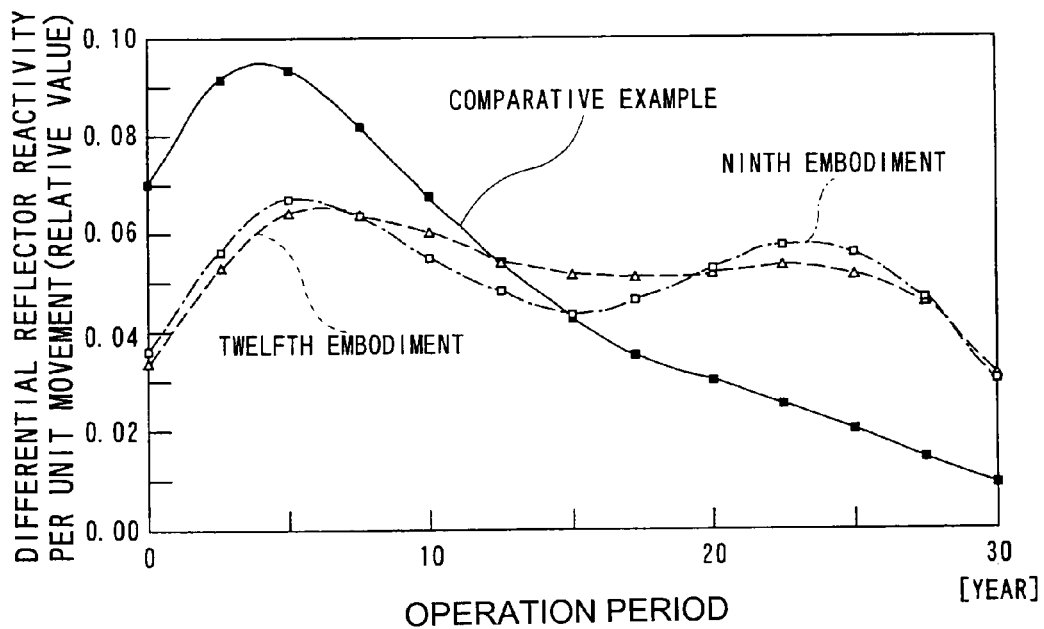
FIG. 21 is a graph showing the relationship between an operation period and differential reflector reactivity of the fast reactor shown in FIG. 19.

FIG. 21 is a graph showing the differential reflector reactivity during operation of this embodiment together with the results of the comparative example and the ninth embodiment. In the comparative example, the differential reflector reactivity tends to increase at the initial stage and then tends to decrease with time. However, in this embodiment, the differential reflector reactivity by the movement of the reflector is relatively flat from the initial to the last burn-up stage. In addition, it is found that the differential reflector reactivity of this embodiment is constant as compared to the result of the ninth embodiment.

The reason for the rate of increase in reactivity, that is, the differential reflector reactivity is further improved as described above is that the distribution of the fissile material ratio is finely controlled, and hence the change in rate of increase in reactivity, that is, in differential reflector reactivity, can be decreased by the movement of the reflector.

As a result, the decrease in thermal power of the reactor core due to the decrease in reactivity can be suppressed, and the control of the flow rate of steam and the control range of the reflector moving speed may be limited or may be omitted in some cases. Accordingly, a fast reactor can be provided which is driven by simple operation and which has high safety and superior efficiency.

Thirteenth Embodiment

Figure 22:
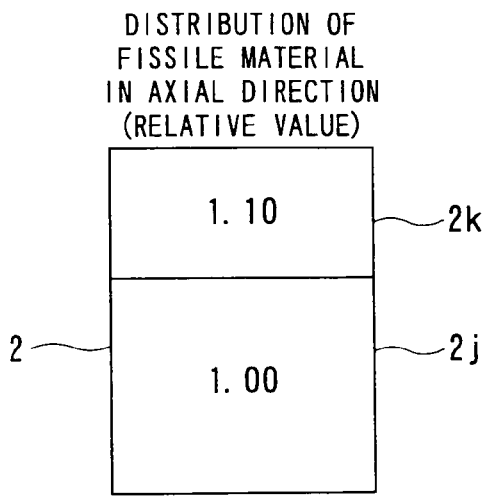
FIG. 22 is a view showing the distribution of a fissile material in the axial direction of a reactor core of a fast reactor of a thirteenth embodiment according to the present invention.

Next, referring to FIG. 22, a fast reactor having a reflector control system of a thirteenth embodiment of the present invention will be described. FIG. 22 is an enlarged view of the reactor core 2 shown in FIG. 12. The reactor core 2 is divided into two regions in the axial direction each having a different ratio of a fissile material (U enrichment or Pu enrichment) in fuel elements.

In particular, when the fissile material ratio in a first region $2j$ is set to 1.0 as a relative value, the region $2j$ being a region between the bottom end of the reactor core and approximately one half of the height thereof, the fissile material ratio in a region $2k$ on the first region $2j$ is increased by 10%, that is, the relative value is set to 1.10.

Figure 24:
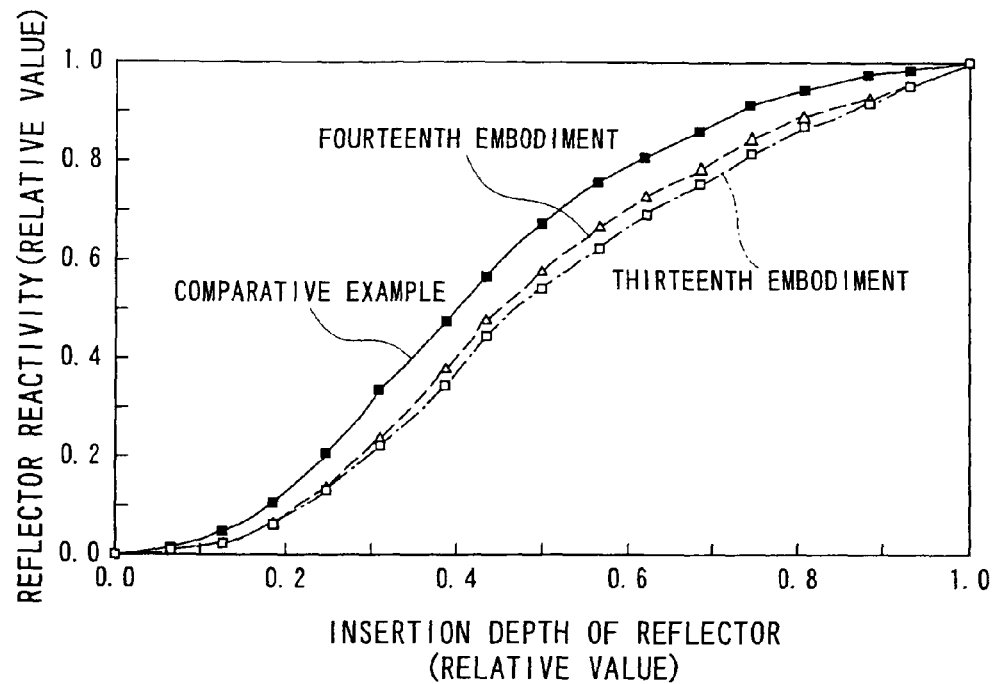
FIG. 24 is a graph showing the relationship between an insertion depth of a reflector (which corresponds to distance between top of reflector and bottom of reactor core) and reflector reactivity of the fast reactors shown in FIGS. 22 and 23.

FIG. 24 is a graph showing the relationship between the insertion depth of the reflector (which corresponds to distance between top of reflector and bottom of reactor core) and the reactivity of this embodiment. It is found that, in this embodiment, the rate of increase in reactivity is approximately constant from the initial to the middle burn-up stage and is also approximately constant from the middle to the last burn-up stage.

Figure 25:
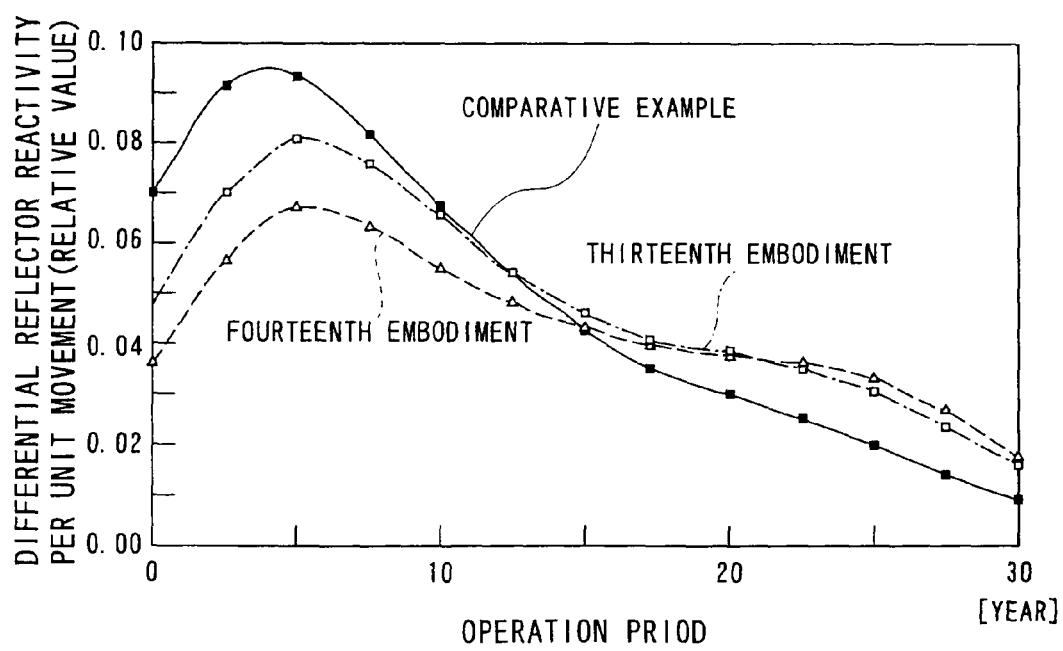
FIG. 25 is a graph showing the relationship between an operation period and differential reflector reactivity of the fast reactors shown in FIGS. 11 and 12.

FIG. 25 is a graph showing the differential reflector reactivity during operation of the thirteenth embodiment. In the thirteenth embodiment, compared to the result of the comparative example, the differential reflector reactivity by the movement of the reflector is relatively flat from the initial to the last burn-up stage.

Unlike the case of the ninth embodiment, in this embodiment, a region in which the fissile material ratio is increased is not provided between the bottom of the reactor core and approximately one eighth (top end is regarded as one) of the height thereof, and the structure is simplified. However, the degree of suppressing the increase in reflector reactivity at the last burn-up stage is lower than that of the ninth embodiment.

As a result, the decrease in thermal power of the reactor core due to the decrease in reactivity can be suppressed, and the control of the flow rate of steam and the control range of the reflector moving speed may be limited or may be omitted in some cases. Accordingly, a fast reactor can be provided which is driven by simple operation and which has high safety and superior efficiency.

Fourteenth Embodiment

Figure 23:
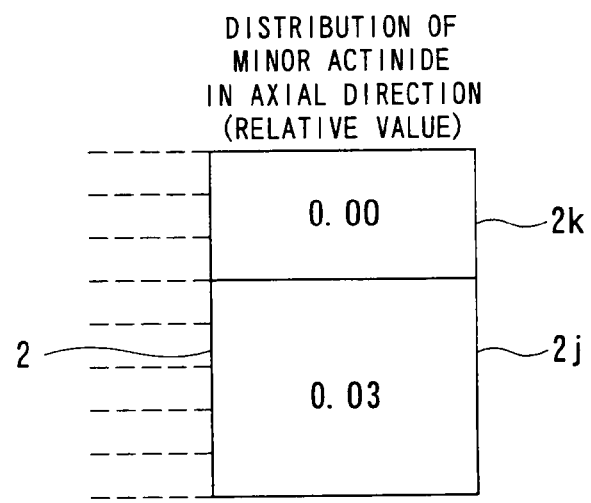
FIG. 23 is a view showing the distribution of a minor actinide in the axial direction of a reactor core of a fast reactor of a fourteenth embodiment according to the present invention.

Next, referring to FIG. 23, a fast reactor having a reflector control system of a fourteenth embodiment of the present invention will be described. FIG. 23 is an enlarged view of the reactor core 2 shown in FIG. 12. The reactor core 2 is divided into two regions in the axial direction each having a different minor actinide ratio.

In particular, when the ratio of minor actinide Np-238 (neptunium-238) to total fuel material in fuel elements is set to 0.03 (3.0 percent by weight) in the first region $2j$, the region $2j$ being a region between the bottom end of the reactor core and approximately one half of the height thereof, the minor actinide ratio in the region $2k$ provided on the first region $2j$ is set to zero. In this embodiment, the ratio of the fissile material to total fuel material in each region is the same.

FIG. 24 is a graph showing the relationship between the insertion depth of the reflector and the reactivity of the fourteenth embodiment. It is found that the reactivity of this embodiment is approximately linearly increased from the initial to the middle burn-up stage and is also approximately linearly increased from the middle to the last burn-up stage.

FIG. 25 is a graph showing the differential reflector reactivity during operation of the fourteenth embodiment. In the fourteenth embodiment, compared to the result of the comparative example, the differential reflector reactivity by the movement of the reflector is flat from the initial to the last burn-up stage.

As can be seen from FIGS. 24 and 25, the same effect as that of the thirteenth embodiment can be obtained. The reason for this is that since the minor actinide has a large neutron capture cross-section, the same effect as that decreasing the ratio of a fissile material can be obtained.

As a result, as is the case of the thirteenth embodiment, since the decrease in thermal power of the reactor core due to the decrease in reactivity can be suppressed, the control of the flow rate of steam and the control range of the reflector moving speed may be limited or may be omitted in some cases. Accordingly, a fast reactor can be provided which is driven by simple operation and which has high safety and superior efficiency.

In addition, when the reactor core is more finely divided, and the ratio of the minor actinide is gradually decreased toward the upper side region, it is naturally understood that the effect described above can be further enhanced.

Fifteenth Embodiment

Figure 26:
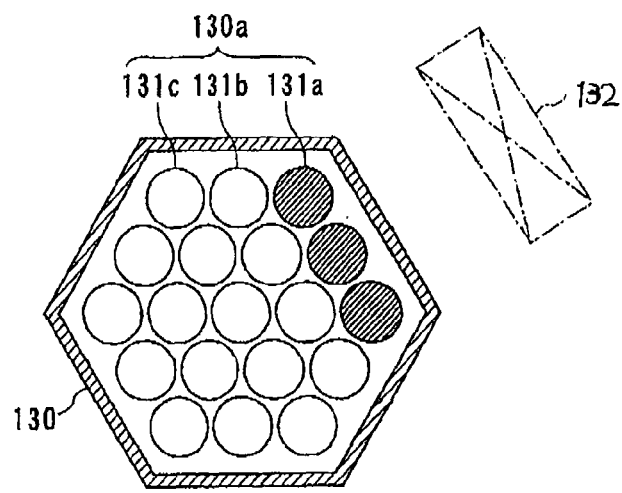
FIG. 26 is a schematic view of fuel pins pulled out of a fuel assembly applied to a nuclear reactor of a fifteenth embodiment according to the present invention.

FIG. 26 is a schematic view showing fuel pins pulled out from a fuel assembly applied to a fast reactor of a fifteenth embodiment of the present invention. The fuel assembly is loaded in the core, which is the same as the core 2 shown in FIG. 12, that is, the schematic view of the right half of a fast reactor having reflector control system.

In a fuel pin bundle $130a$ placed in a wrapper tube 130, fuel pins $131a$ facing a neutron reflector 132 have a smaller ratio of a fissile material to a total heavy metal fuel than that of fuel pins $131c$ placed at a distance from the neutron reflector 132.

In general, when a neutron reflector containing a moderator is lifted upward from a coolant inlet side (bottom portion side) to a coolant outlet side (head portion side), neutrons leaked from a reactor core are moderated by the neutron reflector and are then sent back to the reactor core. Hence, the ratio of moderated neutrons in a total heavy metal fuel filled in a fuel pin facing the neutron reflector is increased. Accordingly, even when the ratio of a fissile material to the total heavy metal fuel filled in the above fuel pin is set equal to that in other fuel pin located at a distance from the neutron reflector, a thermal spike phenomenon inevitably occurs in case of reflector made of neutron moderating material such as graphite or SiC.

Accordingly, in consideration of the phenomenon described above, in this embodiment, the ratio of the fissile material to the total heavy metal fuel contained in the fuel pin 131a, facing the neutron reflector 132, of the fuel pin bundle 130a placed in the wrapper tube 130 is set relatively smaller than that in the fuel pin 131c placed at a distance from the neutron reflector 132.

Hence, in this embodiment, since the structure described above is formed, uneven increase in power of the fuel pin bundle 130a can be prevented, and hence the thermal spike phenomenon can be suppressed.

In addition, when the ratio of a fissile material to a total heavy metal fuel contained in a fuel pin 131b, located adjacent to (inside) the fuel pin 131a facing the neutron reflector 132, is set relatively smaller than that of the fuel pin 131c placed at a distance from the neutron reflector 132, the thermal spike phenomenon can be further suppressed.

Furthermore, in this embodiment, the ratio of the fissile material to the total heavy metal fuel contained in the fuel pin 131a facing the neutron reflector 132 is set relatively smaller than that of the fuel pin 131c placed at a distance from the neutron reflector 132, and in addition to the case described above, the fuel smear density in the fuel pin 131a facing the neutron reflector 132 may be set relatively smaller than that of the fuel pin 131c placed at a distance from the neutron reflector 132. Also in the case described above, uneven increase in power of the fuel pin bundle 130a can be prevented, and hence the thermal spike phenomenon can be suppressed. In this embodiment, the fuel smear density is a density defined by data obtained when a fuel is evenly applied onto the internal surface of a fuel pin.

Sixteenth Embodiment

Figure 27:
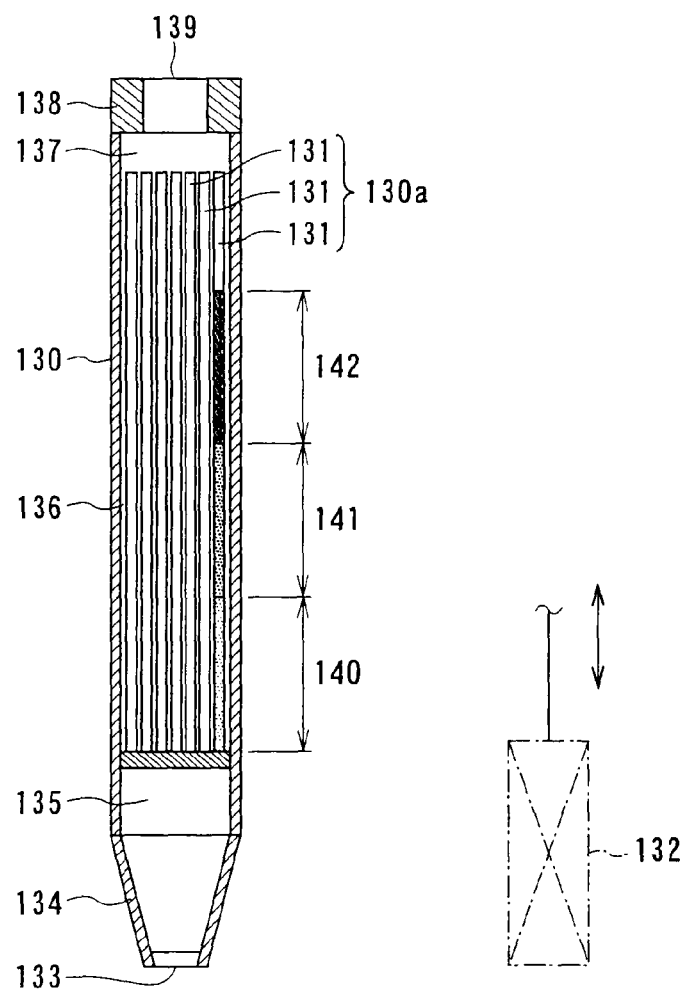
FIG. 27 is a schematic view of fuel pins pulled out of a fuel assembly applied to a nuclear reactor of a sixteenth embodiment according to the present invention.

FIG. 27 is a schematic view showing fuel pins pulled out from a fuel assembly applied to a fast reactor of a sixteenth embodiment of the present invention.

In this embodiment, fuel pins 131 forming the fuel pin bundle 130a are placed in the wrapper tube 130, and a low fissile material region 140, an intermediate fissile material region 141, and a high fissile material region 142 are provided in the fuel pin 131 in that order along the axial direction from a coolant inlet 133 side (bottom portion side) to a coolant outlet 139 side.

In general, the wrapper tube 130 has, from the coolant inlet 133 side (bottom portion side) to the coolant outlet 139 side (head portion side), the coolant inlet 133, a nozzle 134, a coolant inlet plenum 135, a fuel chamber 136 accommodating the fuel pin bundle 130a holding a plurality of the fuel pins 131, a coolant output plenum 137, a handling head 138, and the coolant outlet 139.

In the wrapper tube 130 having the structure as described above, when the neutron reflector 132 is about to pass through the fuel chamber 136 of the wrapper tube 130 at the coolant inlet 133 (bottom portion side) side while being lifted toward the coolant outlet 139 side, a thermal spike phenomenon occurs, and as a result, uneven increase in power of the fuel pin bundle 130a occurs.

In consideration of the problem described above, in this embodiment, the low fissile material region 140, the intermediate fissile material region 141, and the high fissile material region 142 are provided in the fuel pin 131 in that order from the coolant inlet 133 side (bottom portion side) to the coolant outlet 139 side.

In this embodiment, since the structure is formed as described above, when the neutron reflector 132 passes through the fuel pin 131 at the coolant inlet 133 side, the occurrence of thermal spike phenomenon is suppressed by the influence of the low fissile material region 140, and as a result, a uniform power distribution can be obtained in the axial direction.

As described above, in this embodiment, the low fissile material region 140, the intermediate material region 141, and the high fissile material region 142 are provided in that order from the coolant inlet 133 side (bottom portion side) to the coolant outlet 139 side. However, In addition to the above example, the fuel smear density may be gradually increased from the coolant inlet 133 side to the coolant outlet 139 side.

Seventeenth Embodiment

Figure 28:
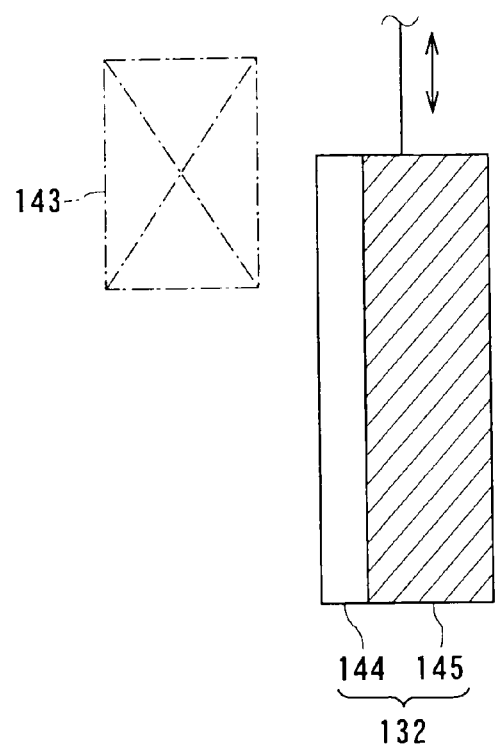
FIG. 28 is a schematic view of a neutron reflector applied to a nuclear reactor of a seventeenth embodiment according to the present invention.

FIG. 28 is a schematic view showing a neutron reflector applied to a fast reactor of a seventeenth embodiment according to the present invention.

In this embodiment, in addition to increase in neutron reflection efficiency of the neutron reflector 132, it is intended to suppress the thermal spike phenomenon. A part of the neutron reflector 132 facing a fuel assembly (reactor core) 143 is formed of a structural member 144, such as stainless steel, containing no moderator, and the other part of the neutron reflector 132 is formed of a moderator member 145 containing a moderator such as SiC.

In this embodiment, since the part of the neutron reflector 132 facing the fuel assembly 143 is formed of the structural member 144 and the other part of the neutron reflector 132 is formed of the moderator member 145 as described above, in addition to the increase in neutron reflection efficiency of the neutron reflector 132, the thermal spike phenomenon can be suppressed which occurs when the neutron reflector 132 passes through the bottom portion side of the fuel pin.

Eighteenth Embodiment

Figure 29:
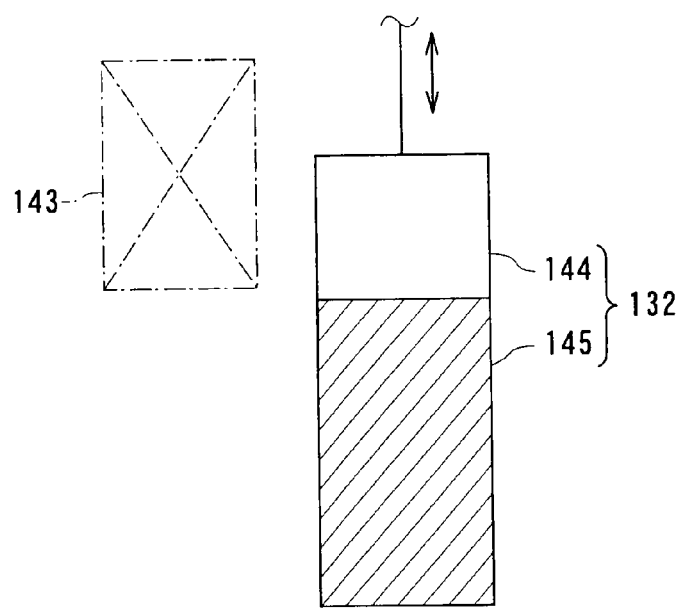
FIG. 29 is a schematic view of a neutron reflector applied to a nuclear reactor of an eighteenth embodiment according to the present invention.

FIG. 29 is a schematic view showing a neutron reflector applied to a fast reactor of an eighteenth embodiment according to the present invention.

In this embodiment, in consideration of the thermal spike which occurs when the neutron reflector 132 located at a position lower than the fuel assembly 143 is lifted to the head portion side thereof at the start of burn-up of the fuel assembly 143, a part of the head portion of the neutron reflector 132 at the lifting direction side is formed of the structural member 144, such as stainless steel, containing no moderator, and the other part of the neutron reflector 132 is formed of the moderator member 145 containing a moderator such as SiC.

In this embodiment, since the part of the head portion of the neutron reflector 132 at the lifting direction side is formed of the structural member 144 and the other part of the neutron reflector 132 is formed of the moderator member 145 as described above, the thermal spike phenomenon can be suppressed which occurs when the neutron reflector 132 passes through the bottom side of the fuel pin, a uniform distribution of power can be obtained, and when the neutron reflector 132 reaches the head portion of the fuel pin, the neutron reflection efficiency can be maintained high by the moderator member 145.

Nineteenth Embodiment

Figure 30:
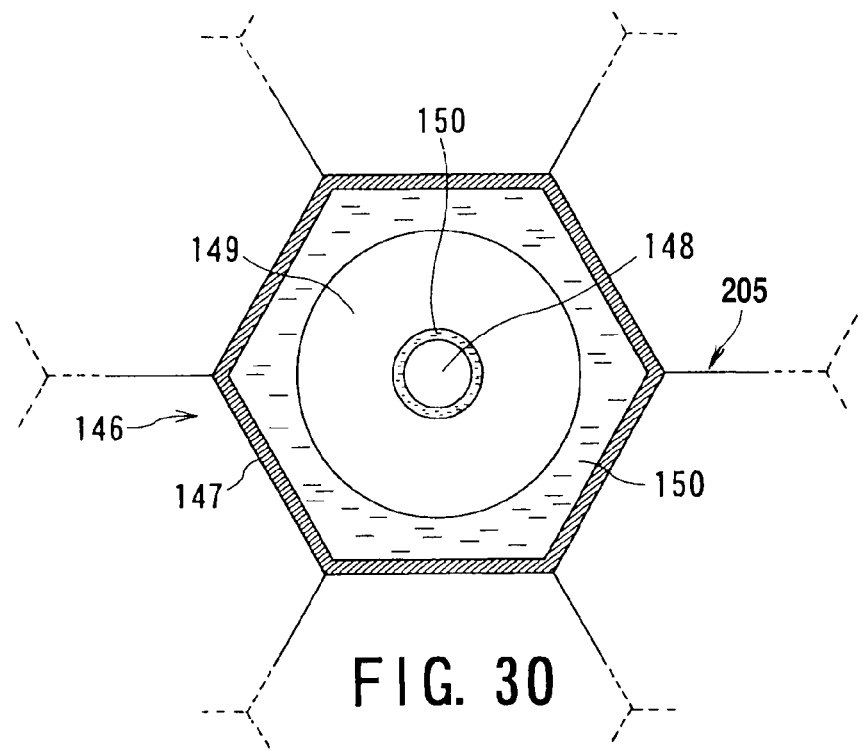
FIG. 30 is a schematic view of a neutron absorption assembly applied to a nuclear reactor of a nineteenth embodiment according to the present invention.

FIG. 30 is a schematic view showing a neutron absorption assembly applied to a fast reactor of a nineteenth embodiment according to the present invention.

A neutron absorption assembly 146 of this embodiment is placed among fuel assemblies and is formed of a polygonal case 147 such as a hexagonal case, a core shutdown rod 148 provided at the center thereof, and a tube-shaped fixed absorber 149 provided outside the core shutdown rod 148.

Heretofore, in order to further increase the life of a reactor core of a fast reactor, as described above, excess reactivity of the reactor core is designed to be high, excess reactivity at an initial operation after the construction is absorbed in a fixed absorber, the fixed absorber is pulled out when the excess reactivity is decreased during the operation, and the reactivity of the fuel assembly (reactor core) is then adjusted only by moving a neutron reflector.

In the case described above, the core shutdown rod 148 which is to be inserted into the fuel assembly only when accident occurs is accommodated in the vicinity of the fuel assembly independently of the fixed absorber 149. However, the space is very limited, and hence the improvement has been desired.

In consideration of the problem described above, that is, in this embodiment, the neutron absorption assembly 146 is placed among fuel assemblies and is formed of the polygonal case 147 such as a hexagonal case, the core shutdown rod 148 provided at the center thereof, and the tube-shaped fixed absorber 149 provided outside the core shutdown rod 148. In FIG. 30, reference numeral 150 indicates a coolant.

As described above, according to this embodiment, in the neutron absorption assembly 146, since the core shutdown rod 148 and the tube-shaped fixed absorber 149 are both accommodated in one cylindrical or polygonal case, such as the hexagonal tube 147, the space can be efficiently used. Hence, the safety operation can be performed while the fuel assemblies may have a larger degree of freedom of designing, placement, and the like.

Figure 31:
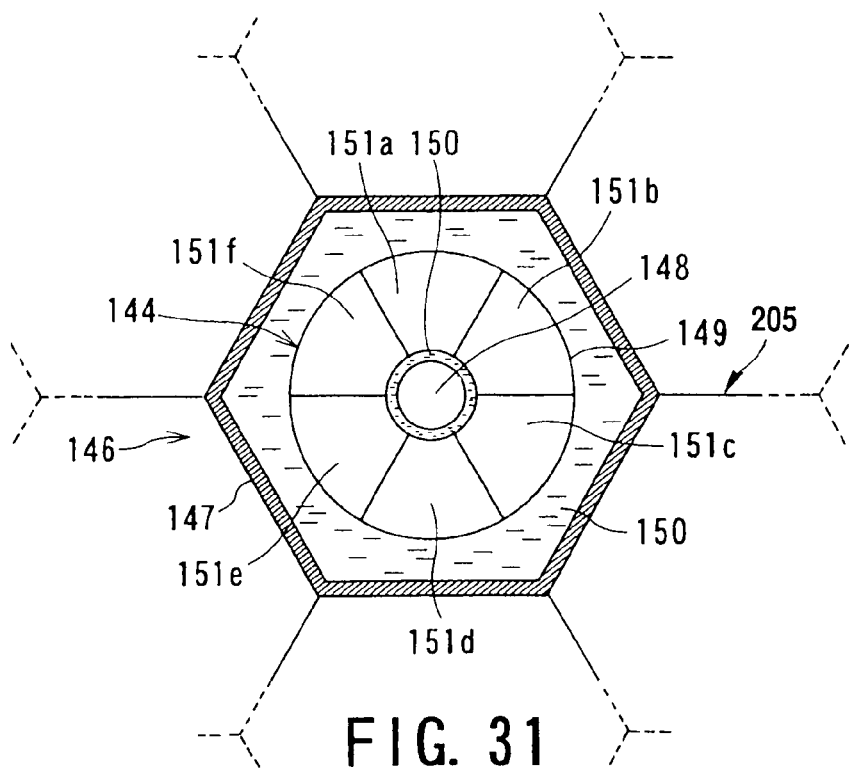
FIG. 31 is a schematic view showing another neutron absorption assembly applied to the nuclear reactor of the nineteenth embodiment according to the present invention.

In this embodiment, the fixed absorber 149 is formed to have a tube shape, and the core shutdown rod 148 is inserted into the center of the fixed absorber 149. However, in addition to the case described above, for example, as shown in FIG. 31, the tube-shaped fixed absorber 149 may be divided, for example, into six segments 151a, 151b, and so on, and some segments described above may be replaced with the stainless steel-made structural members 144.

After some segments described above forming the fixed absorber 149 are replaced with the structural members 144, when the fixed absorber thus formed is then placed among the fuel assemblies, the reactivity can be effectively controlled, and as a result, the adjustment of the excess reactivity can be performed suitably in accordance with an operation plan.

Twentieth Embodiment

Figure 32:
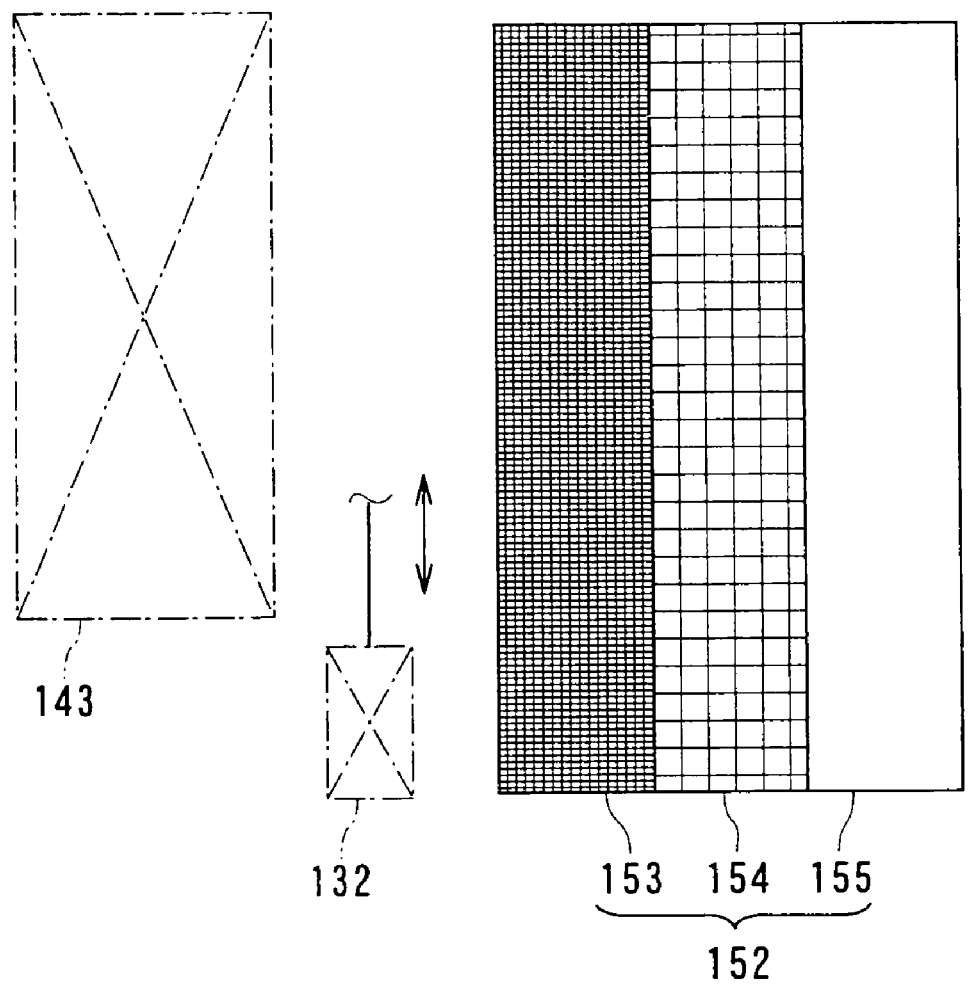
FIG. 32 is a schematic view of a minor actinide annihilation assembly applied to a nuclear reactor of a twentieth embodiment according to the present invention.

FIG. 32 is a schematic view showing a minor actinide annihilation assembly which is provided instead of a related neutron shielding member 212 and is suitably applied to a fast reactor of a twentieth embodiment according to the present invention.

A minor actinide annihilation assembly 152 of this embodiment is formed of three portions, a high concentration moderator/minor actinide mixed portion 153, a low concentration moderator/minor actinide mixed portion 154, and a minor actinide portion 155, provided in that order from a side facing the fuel assembly 143 to the outside.

Heretofore, in order to effectively annihilate minor actinides, particularly neptunium, it has been believed that the number of low energy neutrons having a large cross-section must be increased, and that the addition of a moderator such as zirconium hydride is effective.

However, in a related neutron shielding member 212, since the outside thereof is degraded with neutrons having a low energy, even when zirconium hydride is added thereto, a problem may arise in that annihilation of minor actinides cannot be efficiently performed.

In consideration of the problem described above, that is, in this embodiment, the minor actinide annihilation assembly 152 is provided instead of the related neutron shielding member 212 and is formed of the three portions, the high concentration moderator/minor actinide mixed portion 153, the low concentration moderator/minor actinide mixed portion 154, and the minor actinide portion 155, provided in that order from the side facing the fuel assembly 143 to the outside.

As described above, the minor actinide annihilation assembly 152 is formed of the high concentration moderator/minor actinide mixed portion 153, the low concentration moderator/minor actinide mixed portion 154, and the minor actinide portion 155, provided in that order from the side facing the fuel assembly 143 to the outside, so that the concentration distribution is changed among the portions described above. Hence, high neutron flux can be obtained at low energy spectra, and the annihilation amount of minor actinides can be further increased.

What is claimed is:

1. A fast reactor having a reflector control system comprising:
   a reactor vessel which is filled with a liquid metal coolant;
   a reactor core including a fuel assembly, which is placed at a central position of the reactor vessel; and
   a neutron reflector provided outside the reactor core so as to be moved in a vertical direction in an installed state of the fast reactor for adjusting leakage of neutrons from the reactor core so as to control a reactivity thereof;
   wherein the neutron reflector is moved in an upward direction in accordance with a change in reactivity caused by burn-up of a fuel, and the neutron reflector has a high reflection region at least at a lower side thereof, the high reflection region having a high fast-neutron reflection ability as compared to that of the other region,
   wherein the reactor core further includes a neutron absorption assembly which is placed at a central position of the fuel assembly,
   wherein the neutron absorption assembly comprises a core shutdown rod and a fixed absorber, accommodated in a case member, and
   wherein a structure of the core shutdown rod placed at a central position of the case member is different from a structure of the fixed absorber disposed outside of the core shutdown rod.

2. The fast reactor according to claim 1, wherein the fixed absorber has one tube-shaped structure formed of a plurality of segments.

3. The fast reactor according to claim 2, wherein the segments include at least of one segment being replaced with a structural member so as to adjust the reactivity of the fuel assembly.

4. The fast reactor according to claim 1, wherein the case member has a polygonal structure.

5. The fast reactor according to claim 1, wherein the fixed absorber comprises a single solid member with a central aperture, and the shutdown rod is disposed in the central aperture.

6. The fast reactor according to claim 5, wherein the solid member has a cylindrical shape with a cylindrical central aperture, and the rod has a solid cylindrical shape.

7. The fast reactor according to claim 1, wherein the fixed absorber comprises a single cylindrical member removably disposed in the case member.

8. The fast reactor according to claim 1, wherein the fixed absorber comprises a member, composed of a plurality of segments, having inner and outer surfaces each having a cylindrical shape, the inner surfaces forming a closed cylindrical central aperture.

9. The fast reactor according to claim 1, comprising said liquid metal disposed in the case member between an outer surface of the fixed absorber and the case member and between an inner surface of the fixed absorber and the shutdown rod.

* * * * *